United States Patent
Zhi et al.

(10) Patent No.: US 9,515,779 B2
(45) Date of Patent: Dec. 6, 2016

(54) MEMORY ALLOCATION METHOD AND SYSTEM, USER EQUIPMENT, AND NETWORK DEVICE

(71) Applicant: Huawei Technologies Co., Ltd., Shenzhen, Guangdong (CN)

(72) Inventors: Yuliang Zhi, Tianjin (CN); Bingzhao Li, Beijing (CN); Yongqiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 14/609,831

(22) Filed: Jan. 30, 2015

(65) Prior Publication Data
US 2015/0139168 A1 May 21, 2015

Related U.S. Application Data

(63) Continuation of application No. PCT/CN2012/079425, filed on Jul. 31, 2012.

(51) Int. Cl.
*H04L 1/18* (2006.01)
(52) U.S. Cl.
CPC .......... *H04L 1/1835* (2013.01); *H04L 1/1812* (2013.01); *H04L 1/1822* (2013.01); *H04L 1/1861* (2013.01);
(Continued)

(58) Field of Classification Search
CPC .... H04L 1/1835; H04L 1/1822; H04L 1/1877; H04L 1/1812
See application file for complete search history.

(56) References Cited

U.S. PATENT DOCUMENTS

2005/0220024 A1  10/2005  Agin et al.
2007/0064728 A1*  3/2007  Nitta ..................... H04W 88/06
370/466
(Continued)

FOREIGN PATENT DOCUMENTS

CN           1764100 A     4/2006
CN        101079666 A    11/2007
(Continued)

OTHER PUBLICATIONS

"3rd Generation Partnership Project; Technical Specification Group Radio Access Network; Radio Resource Control (RRC); Protocol specification (Release 11)", 3GPP TS 25.331 v11.2.0, Jun. 2012, 1944 pages.
(Continued)

*Primary Examiner* — Albert T Chou

(57) ABSTRACT

Embodiments of the present invention provide a memory allocation method and system, a user equipment, and a network device. The method includes: determining, by a user equipment (UE), a high speed downlink shared channel (HS-DSCH) physical layer category for memory allocation according to a first network configuration sent by a first network device; using the total number of soft channel bits corresponding to the determined HS-DSCH physical layer category as a total allocated memory size of a soft memory buffer, dividing the total allocated memory size of the soft memory buffer by the total number of serving or secondary serving HS-DSCH cells corresponding to the determined HS-DSCH physical layer category, and determining a soft memory buffer size of each HS-DSCH transmission channel; and allocating the soft memory buffer size of each HS-DSCH transmission channel among the HARQ processes in the first network configuration of the corresponding HS-DSCH transmission channel.

20 Claims, 3 Drawing Sheets

(52) U.S. Cl.
CPC .......... *H04L 1/1864* (2013.01); *H04L 1/1874* (2013.01); *H04L 1/1877* (2013.01)

(56) References Cited

U.S. PATENT DOCUMENTS

| | | | |
|---|---|---|---|
| 2007/0189248 A1* | 8/2007 | Chang | H04L 1/0066 370/338 |
| 2008/0301514 A1 | 12/2008 | Ma et al. | |
| 2010/0050034 A1* | 2/2010 | Che | H04L 1/1845 714/748 |
| 2011/0035639 A1 | 2/2011 | Earnshaw et al. | |
| 2011/0086656 A1* | 4/2011 | Zhou | H04W 8/24 455/507 |
| 2012/0087396 A1* | 4/2012 | Nimbalker | H04L 1/1822 375/219 |
| 2012/0120889 A1 | 5/2012 | Cheng et al. | |
| 2012/0207130 A1* | 8/2012 | Jang | H04W 8/24 370/331 |
| 2012/0263122 A1* | 10/2012 | Shi | H04W 8/24 370/329 |
| 2012/0320853 A1 | 12/2012 | Kwon et al. | |

FOREIGN PATENT DOCUMENTS

| | | |
|---|---|---|
| CN | 101860898 A | 10/2010 |
| WO | WO 2011/096683 A2 | 8/2011 |

OTHER PUBLICATIONS

"3rd Generation Partnership Project; Technical Specification Group Radio Access Network; UE Radio Access capabilities (Release 11)", 3GPP TS 25.306 v11.2.0, Jun. 2012, 65 pages.

* cited by examiner

MEMORY ALLOCATION METHOD AND SYSTEM, USER EQUIPMENT, AND NETWORK DEVICE

CROSS-REFERENCE TO RELATED APPLICATIONS

This application is a continuation of International Application No. PCT/CN2012/079425, filed on Jul. 31, 2012, which is hereby incorporated by reference in its entirety.

TECHNICAL FIELD

The present invention relates to the communications technologies, and in particular, to a memory allocation method and system, a user equipment, and a network device.

BACKGROUND

In an existing radio communications system, in order to guarantee transmission quality of high speed downlink data, when a user equipment (UE) is configured with a single transmission channel, or is configured with a single transmission channel, and meanwhile, the single transmission channel is configured with multiple-input multiple-output (MIMO), namely, single-transmission-channel+MIMO operation, or is configured with multiple transmission channels, or is configured with multiple-transmission-channel+MIMO operation, memory allocated to each hybrid automatic repeat request (HARQ) process does not exceed 43200 bits.

When a UE is configured with a 4*4 MIMO operation (it should be noted that the 4*4 MIMO operation is a kind of operation in an N*M MIMO operating system, where N represents the number of transmitting antennas, and M represents the number of receiving antennas), if the number of HARQ processes configured for each transmission channel in the 4*4 MIMO operation is the same as the number of HARQ processes configured for each transmission channel in the MIMO operation (12, 14 or 16 processes), as the data volume transmitted by each HARQ process in the 4*4 MIMO operation changes to two times of the data volume transmitted by each transmission channel in the MIMO operation, in the 4*4 MIMO operation, memory allocated to each HARQ process does not exceed 86400 bits. If the number of HARQ processes configured for each transmission channel in the 4*4 MIMO operation (24, 28 or 32 processes) is double the number of HARQ processes configured for each transmission channel in the MIMO operation, in this case, as the data volume transmitted by each HARQ process in the 4*4 MIMO operation is the same as the data volume transmitted by each transmission channel in the MIMO operation, the number of soft channel bits obtained by each HARQ process does not exceed a maximum memory threshold value, namely, 43200 bits.

In existing HARQ process memory allocation, the UE obtains an HS-DSCH physical layer category corresponding to a high speed downlink packet access (HSDPA) capability thereof based on an existing high speed downlink shared channel (HS-DSCH) physical layer category standard, and reports the corresponding HS-DSCH physical layer category to a network device. For example, when the UE reports an HS-DSCH physical layer category corresponding to a capability of supporting a six-transmission-channel operation and the network device configures a five-transmission-channel operation for the UE, as the existing HS-DSCH physical layer category standard does not specify an HS-DSCH physical layer category that separately represents a five-transmission-channel operation, the UE uses, based on the configured five-transmission-channel operation, an HS-DSCH physical layer category corresponding to the six-transmission-channel operation in the HS-DSCH physical layer category standard, queries the HS-DSCH physical layer category standard according to the HS-DSCH physical layer category corresponding to the six-transmission-channel operation, to obtain the total number of soft channel bits 3110400 of a soft memory buffer of a media access control (Media Access Control-hs/ehs, MAC-hs/ehs) entity corresponding to the six-transmission-channel operation, allocates the total 3110400 soft channel bits among the actually configured five transmission channels (HS-DSCH transmission channels), determine that the number of soft channel bits obtained by each transmission channel is 622080, and further allocates the soft channel bits obtained by each transmission channel among all HARQ processes. Assuming that the number of pre-configured HARQ processes is 12, the number of soft channel bits 622080 obtained by each transmission channel is divided by the number of HARQ processes 12, to acquire that the number of soft channel bits obtained by each process is 51840, which exceeds the maximum memory threshold value for each HARQ process, namely, 43000 bits. The system will generate an HARQ process memory allocation error, and normal data transmission is affected.

Therefore, if the HARQ process memory allocation is carried out based on the existing HS-DSCH physical layer category standard, because the existing HS-DSCH physical layer category standard does not specify HS-DSCH physical layer categories that separately represent five-transmission-channel and seven-transmission-channel operations or HS-DSCH physical layer categories corresponding to 4*2 MIMO and 4*4 MIMO operations, when the network device configures the UE on the five-transmission-channel operation, seven-transmission-channel operation, 4*2 MIMO operation, and 4*4 MIMO operation, an error occurs in HARQ process memory allocation, which reduces data transmission efficiency.

SUMMARY

A memory allocation method and system, a user equipment, and a network device provided in the present invention can reduce errors in HARQ process memory allocation and guarantees data transmission quality.

In a first aspect, an embodiment of the present invention provides a memory allocation method, where the method includes: determining, by a user equipment (UE), a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes; using the total number of soft channel bits corresponding to the determined HS-DSCH physical layer category as a total allocated memory size of a soft memory buffer, allocating the total allocated memory size of the soft memory buffer among the HS-DSCH transmission channels, and determining a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocating the soft memory buffer size of each HS-DSCH transmission channel among the HARQ processes in the first network configuration of the corresponding HS-DSCH transmission channel.

The first network configuration further includes multiple-input multiple-output (MIMO) configuration information, and the MIMO configuration information includes 2*2 MIMO and/or 4*2 MIMO and/or 4*4 MIMO.

Each HS-DSCH transmission channel is an HS-DSCH transmission channel configured by the first network device. The total number of serving or secondary serving HS-DSCH cells corresponding to the determined HS-DSCH physical layer category is the total number of HS-DSCH transmission channels supported by the UE, or the total number of HS-DSCH transmission channels that can be configured by the first network device at most.

In a first possible implementation manner, according to the first aspect, if the UE configures 4*4 MIMO on some or all of the HS-DSCH transmission channels, the allocating the soft memory buffer size of each HS-DSCH transmission channel among the HARQ processes in the first network configuration of the corresponding HS-DSCH transmission channel may be specifically implemented as follows:

for each HS-DSCH transmission channel configured with 4*4 MIMO, allocating the soft memory buffer among the HARQ processes in the first network configuration; or for an HS-DSCH transmission channel not configured with 4*4 MIMO, using an HARQ process memory value calculated based on an HS-DSCH channel configured with a 4*4 MIMO operation; or for an HS-DSCH transmission channel not configured with 4*4 MIMO, using half of an HARQ process memory value calculated based on an HS-DSCH channel configured with a 4*4 MIMO operation.

In a second possible implementation manner, with reference to the first aspect or the first possible implementation manner, if the UE supports 4*4 MIMO, and the UE configures 4*2 MIMO on some or all of the HS-DSCH transmission channels, the allocating the soft memory buffer size of each HS-DSCH transmission channel among the hybrid automatic repeat request (HARQ) processes in the first network configuration of the corresponding HS-DSCH transmission channel may be specifically implemented as follows:

for each HS-DSCH transmission channel configured with 4*2 MIMO, allocating half of the memory of the soft memory buffer among the hybrid automatic repeat request (HARQ) processes in the first network configuration; or for each HS-DSCH transmission channel configured with 4*2 MIMO, according to a case in which 4*4 MIMO is configured, allocating the soft memory buffer among the configured hybrid automatic repeat request (HARQ) processes; or for an HS-DSCH transmission channel not configured with 4*2 MIMO, using an HARQ process memory value calculated based on an HS-DSCH channel configured with a 4*2 MIMO operation.

In a third possible implementation manner, with reference to the first aspect, or the first possible implementation manner, or the second possible implementation manner, if the UE does not support 4*4 MIMO, and the UE configures 4*2 MIMO on some or all of the HS-DSCH transmission channels, the allocating the soft memory buffer size of each HS-DSCH transmission channel among the hybrid automatic repeat request (HARQ) processes in the first network configuration of the corresponding HS-DSCH transmission channel may be specifically implemented as follows:

for each HS-DSCH transmission channel configured with 4*2 MIMO, allocating the soft memory buffer among the hybrid automatic repeat request (HARQ) processes in the first network configuration; or for an HS-DSCH transmission channel not configured with 4*2 MIMO, using an HARQ process memory value calculated based on an HS-DSCH channel configured with a 4*2 MIMO operation.

In a second aspect, an embodiment of the present invention provides a user equipment, where the user equipment includes: a first determining module, configured to determine a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes; a second determining module, configured to use the total number of soft channel bits corresponding to the determined HS-DSCH physical layer category as a total allocated memory size of a soft memory buffer based on the HS-DSCH physical layer category determined by the first determining module, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and a first allocating module, configured to allocate the soft memory buffer size of each HS-DSCH transmission channel among the HARQ processes in the first network configuration of the corresponding HS-DSCH transmission channel based on the soft memory buffer size of each HS-DSCH transmission channel determined by the second determining module.

The first network configuration further includes multiple-input multiple-output (MIMO) configuration information, and the MIMO configuration information includes 2*2 MIMO and/or 4*2 MIMO and/or 4*4 MIMO.

Each HS-DSCH transmission channel is an HS-DSCH transmission channel configured by the first network device. The total number of serving or secondary serving HS-DSCH cells corresponding to the determined HS-DSCH physical layer category is the total number of HS-DSCH transmission channels supported by the UE, or the total number of HS-DSCH transmission channels that can be configured by the first network device at most.

In a first possible implementation manner, according to the second aspect, if the UE configures 4*4 MIMO on some or all of the HS-DSCH transmission channel, the first allocating module is specifically configured to:

for each HS-DSCH transmission channel configured with 4*4 MIMO, allocate the soft memory buffer among the HARQ processes in the first network configuration; or for an HS-DSCH transmission channel not configured with 4*4 MIMO, use an HARQ process memory value calculated based on an HS-DSCH channel configured with a 4*4 MIMO operation; or for an HS-DSCH transmission channel not configured with 4*4 MIMO, use half of an HARQ process memory value calculated based on an HS-DSCH channel configured with a 4*4 MIMO operation.

In a second possible implementation manner, according to the second aspect or the first possible implementation manner, if the UE supports 4*4 MIMO, and the UE configures 4*2 MIMO on some or all of the HS-DSCH transmission channels, the first allocating module is specifically configured to:

for each HS-DSCH transmission channel configured with 4*2 MIMO, allocate half of the memory of the soft memory buffer among the hybrid automatic repeat request (HARQ) processes in the first network configuration; or for each HS-DSCH transmission channel configured with 4*2 MIMO, according to a case in which 4*4 MIMO is configured, allocate the soft memory buffer among the configured hybrid automatic repeat request (HARQ) processes; or for an HS-DSCH transmission channel not configured with 4*2 MIMO, use an HARQ process memory value calculated based on an HS-DSCH channel configured with a 4*2 MIMO operation.

In a third possible implementation manner, according to the second aspect, or the first possible implementation manner, or the second possible implementation manner, if the UE does not support 4*4 MIMO, and the UE configures 4*2 MIMO on some or all of the HS-DSCH transmission channels, the first allocating module is specifically configured to:

for each HS-DSCH transmission channel configured with 4*2 MIMO, allocate the soft memory buffer among the hybrid automatic repeat request (HARQ) processes in the first network configuration; or for an HS-DSCH transmission channel not configured with 4*2 MIMO, use an HARQ process memory value calculated based on an HS-DSCH channel configured with a 4*2 MIMO operation.

In a third aspect, an embodiment of the present invention provides a memory allocation method, where the method includes:

receiving, by a second network device, a second network configuration sent by a first network device, where the second network configuration includes a high speed downlink shared channel (HS-DSCH) physical layer category and/or at least one HS-DSCH transmission channel of a user equipment (UE);

using the total number of soft channel bits corresponding to the HS-DSCH physical layer category of the UE as a total allocated memory size of a soft memory buffer, allocating the total allocated memory size of the soft memory buffer among the HS-DSCH transmission channels, and determining a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocating the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the second network device for the HS-DSCH transmission channel in the second network configuration according to the second network configuration.

The second network configuration further includes multiple-input multiple-output (MIMO) configuration information, and the MIMO configuration information includes 2*2 MIMO and/or 4*2 MIMO and/or 4*4 MIMO.

Each HS-DSCH transmission channel is an HS-DSCH transmission channel configured by the first network device. The total number of serving or secondary serving HS-DSCH cells corresponding to the determined HS-DSCH physical layer category is the total number of HS-DSCH transmission channels supported by the UE, or the total number of HS-DSCH transmission channels that can be configured by the first network device at most.

In a first possible implementation manner, according to the third aspect, if the UE supports 4*4 MIMO, and the second network device configures 4*4 MIMO on some or all of the HS-DSCH transmission channels, the allocating the soft memory buffer size of each HS-DSCH transmission channel among the HARQ processes of the corresponding HS-DSCH transmission channel may be specifically implemented as follows:

for each HS-DSCH transmission channel configured with 4*4 MIMO, allocating the soft memory buffer among the HARQ processes of the corresponding HS-DSCH transmission channel; or for an HS-DSCH transmission channel not configured with 4*4 MIMO, using an HARQ process memory value calculated based on an HS-DSCH channel configured with a 4*4 MIMO operation; or for an HS-DSCH transmission channel not configured with 4*4 MIMO, using half of an HARQ process memory value calculated based on an HS-DSCH channel configured with a 4*4 MIMO operation.

In a second possible implementation manner, according to the third aspect or the first possible implementation manner, if the second network device configures 4*2 MIMO on some or all of the HS-DSCH transmission channels, the allocating the soft memory buffer size of each HS-DSCH transmission channel among the HARQ processes of the corresponding HS-DSCH transmission channel may be specifically implemented as follows:

for each HS-DSCH transmission channel configured with 4*2 MIMO, allocating half of the memory of the soft memory buffer among the HARQ processes of the corresponding HS-DSCH transmission channel; or for each HS-DSCH transmission channel configured with 4*2 MIMO, according to a case in which 4*4 MIMO is configured, allocating the soft memory buffer among the HARQ processes of the corresponding HS-DSCH transmission channel; or for an HS-DSCH transmission channel not configured with 4*2 MIMO, using an HARQ process memory value calculated based on an HS-DSCH channel configured with a 4*2 MIMO operation.

In a third possible implementation manner, according to the third aspect, or the first possible implementation manner, or the second possible implementation manner, if the UE does not support 4*4 MIMO, and the second network device configures 4*2 MIMO on some or all of the HS-DSCH transmission channels, the allocating the soft memory buffer size of each HS-DSCH transmission channel among the HARQ processes of the corresponding HS-DSCH transmission channel may be specifically implemented as follows:

for each HS-DSCH transmission channel configured with 4*2 MIMO, allocating the soft memory buffer among the hybrid automatic repeat request (HARQ) processes of the corresponding HS-DSCH transmission channel; or for an HS-DSCH transmission channel not configured with 4*2 MIMO, using an HARQ process memory value calculated based on an HS-DSCH transmission channel configured with a 4*2 MIMO operation.

In a fourth aspect, an embodiment of the present invention provides a network device, where the network device includes: a receiving module, configured to receive a second network configuration sent by another network device, where the second network configuration includes a high speed downlink shared channel (HS-DSCH) physical layer category and/or at least one HS-DSCH transmission channel of a user equipment (UE); a third determining module, configured to use the total number of soft channel bits corresponding to the HS-DSCH physical layer category of the UE as a total allocated memory size of a soft memory buffer according to the HS-DSCH physical layer category of the UE received by the receiving module, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and a second allocating module, configured to allocate the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the network device for the HS-DSCH transmission channel in the second network configuration according to the second network configuration.

The second network configuration further includes multiple-input multiple-output (MIMO) configuration information, and the MIMO configuration information includes 2*2 MIMO and/or 4*2 MIMO and/or 4*4 MIMO.

Each HS-DSCH transmission channel is an HS-DSCH transmission channel configured by the other network device. The total number of serving or secondary serving HS-DSCH cells corresponding to the HS-DSCH physical layer category is the total number of HS-DSCH transmission channels supported by the UE, or the total number of HS-DSCH transmission channels that can be configured by the other network device at most.

In a first possible implementation manner, according to the fourth aspect, if the UE supports 4*4 MIMO, and the network device configures 4*4 MIMO on some or all of the HS-DSCH transmission channels, the second allocating module is specifically configured to:

for each HS-DSCH transmission channel configured with 4*4 MIMO, allocate the soft memory buffer among the HARQ processes of the corresponding HS-DSCH transmission channel; or for an HS-DSCH transmission channel not configured with 4*4 MIMO, use an HARQ process memory value calculated based on an HS-DSCH channel configured with a 4*4 MIMO operation; or for an HS-DSCH transmission channel not configured with 4*4 MIMO, use half of an HARQ process memory value calculated based on an HS-DSCH channel configured with a 4*4 MIMO operation.

In a second possible implementation manner, according to the fourth aspect or the first possible implementation manner, if the UE supports 4*4 MIMO, and the network device configures 4*2 MIMO on some or all of the HS-DSCH transmission channels, the second allocating module is specifically configured to:

for each HS-DSCH transmission channel configured with 4*2 MIMO, allocate half of the memory of the soft memory buffer among the HARQ processes of the corresponding HS-DSCH transmission channel; or for each HS-DSCH transmission channel configured with 4*2 MIMO, according to a case in which 4*4 MIMO is configured, allocate the soft memory buffer among the HARQ processes of the corresponding HS-DSCH transmission channel; or for an HS-DSCH transmission channel not configured with 4*2 MIMO, use an HARQ process memory value calculated based on an HS-DSCH channel configured with a 4*2 MIMO operation.

In a third possible implementation manner, according to the fourth aspect, or the first possible implementation manner, or the second possible implementation manner, if the UE does not support 4*4 MIMO, and the network device configures 4*2 MIMO on some or all of the HS-DSCH transmission channels, the second allocating module is specifically configured to:

for each HS-DSCH transmission channel configured with 4*2 MIMO, allocate the soft memory buffer among the HARQ processes of the corresponding HS-DSCH transmission channel; or for an HS-DSCH transmission channel not configured with 4*2 MIMO, use an HARQ process memory value calculated based on an HS-DSCH transmission channel configured with a 4*2 MIMO operation.

In a fourth possible implementation manner, the network device further includes:

a sending module, configured to send the number of HARQ processes of the HS-DSCH transmission channel to the other network device, so that the other network device sends the number of HARQ processes corresponding to the HS-DSCH transmission channel to the UE.

In a fifth aspect, an embodiment of the present invention provides a user equipment, which includes a first transmitter, a first receiver, and a first processor, where the first processor is configured to determine a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes; use the total number of soft channel bits corresponding to the determined HS-DSCH physical layer category as a total allocated memory size of a soft memory buffer, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocate the soft memory buffer size of each HS-DSCH transmission channel among the HARQ processes in the first network configuration of the corresponding HS-DSCH transmission channel.

In a six aspect, an embodiment of the present invention provides a network device, which includes a second transmitter, a second receiver, and a second processor, where the second processor is configured to receive a second network configuration sent by another network device, where the second network configuration includes a high speed downlink shared channel (HS-DSCH) physical layer category and/or at least one HS-DSCH transmission channel of a user equipment (UE); use the total number of soft channel bits corresponding to the HS-DSCH physical layer category of the UE as a total allocated memory size of a soft memory buffer, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocate the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the network device for the HS-DSCH transmission channel in the second network configuration according to the second network configuration.

According to the above technical solutions, in the embodiments of the present invention, a UE can determine, according to a first network configuration, an HS-DSCH physical layer category corresponding to the first network configuration; obtain the total number of soft channel bits for memory allocation according to the determined HS-DSCH physical layer category, and divide the total number of soft channel bits by the total number of serving or secondary serving HS-DSCH cells corresponding to the determined HS-DSCH physical layer category, to obtain a memory size of each HS-DSCH transmission channel; and allocate the memory size of each HS-DSCH transmission channel among the HARQ processes in the first network configuration of the corresponding HS-DSCH transmission channel. In this way, it can be ensured that when the number of transmission channels configured by a first network device for the UE is not equal to the number of transmission channels corresponding to the HS-DSCH physical layer category, the UE determines a memory size of each transmission channel according to the number of transmission channels corresponding to the HS-DSCH physical layer category, rather than determining a soft channel memory size of each transmission channel according to the number of transmission channels actually configured by the first network device. Therefore, it is ensured that the number of soft channel bits obtained by each HARQ process does not exceed a maximum memory threshold of the corresponding HARQ process, thereby reducing errors in HARQ process memory allocation, and guaranteeing data transmission quality.

BRIEF DESCRIPTION OF THE DRAWINGS

To describe the technical solutions according to the embodiments of the present invention or in the prior art more clearly, the following briefly introduces accompanying drawings for describing the embodiments or the prior art. Apparently, the accompanying drawings in the following description show merely some embodiments of the present invention, and persons of ordinary skill in the art may still derive other drawings according to the accompanying drawings without creative efforts.

DETAILED DESCRIPTION

In order to make the objectives, technical solutions, and advantages of the present invention more comprehensible, the following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions of the present invention can be applied to various radio communications systems, such as a global system for mobile communications system (GSM) system, a general packet radio service (GPRS) system, a code division multiple access (CDMA) system, a CDMA2000 system, a wideband code division multiple access (WCDMA) system, a long term evolution (LTE) system, or a world interoperability for microwave access (WiMAX) system.

The network device may be a base station controller (BSC) in the GSM system, the GPRS system or the CDMA system, or a radio network controller (RNC) in the CDMA2000 system or the WCDMA system, or an evolved base station (eNB) in the LTE system, or an access service network base station (ASN BS) in the WiMAX network, or another network element.

It should be noted that the concepts of multi-carrier, multi-cell and multi-transmission-channel described in the following have the same meaning, that is, one HS-DSCH transmission channel corresponds to one cell, one cell corresponds to one carrier, and one carrier corresponds to one HS-DSCH transmission channel.

The MIMO configuration information described in the following includes 2*2 MIMO and/or 4*2 MIMO and/or 4*4 MIMO. It should be noted that, in a practical application, 2*2 MIMO may be abbreviated as MIMO.

In an HS-DSCH physical layer category, the total number of serving or secondary serving HS-DSCH cells is the total number of HS-DSCH transmission channels or carriers supported by a UE, and is also the total number of HS-DSCH transmission channels that can be configured by a first network device at most.

A second network device described in the following may be a base station (Node B), a base station transceiver (BTS), or the like, and the first network device may be a radio network controller RNC, an evolved base station (eNB), a base station controller (BSC), or the like.

The memory allocation method described in the following refers to a memory allocation method for HARQ processes.

Figure 1:
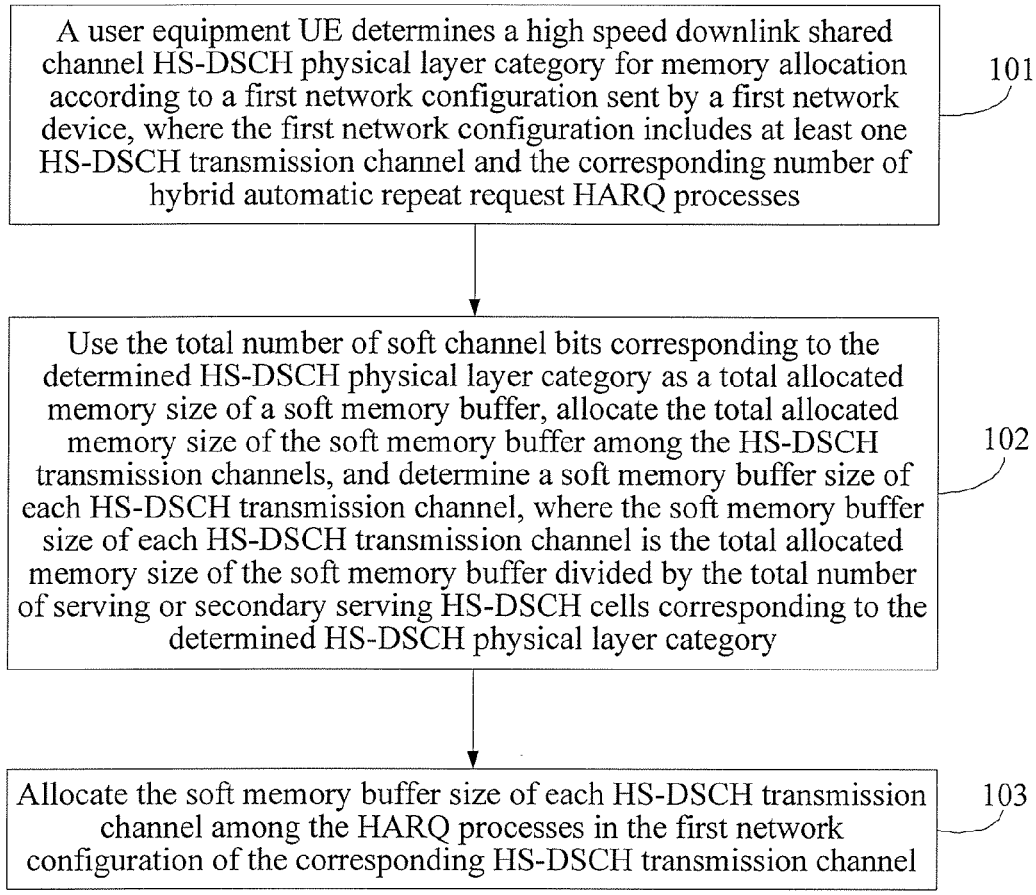
FIG. 1 is a schematic flow chart of a memory allocation method according to an embodiment of the present invention.

FIG. 1 is a schematic flow chart of a memory allocation method according to an embodiment of the present invention. As shown in FIG. 1, the method includes the following:

101: A user equipment (UE) determines a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes.

In an optional implementation manner of the present invention, based on an existing HS-DSCH physical layer category standard, the embodiment of the present invention extends the existing HS-DSCH physical layer category standard, and an extended HS-DSCH physical layer category standard is stored in an HS-DSCH physical layer category table of the embodiment of the present invention, where the HS-DSCH physical layer category table includes a capability category of 4*2 MIMO and a capability category of 4*4 MIMO, which means the extended HS-DSCH physical layer category standard is applicable to a 4*2 MIMO operation and a 4*4 MIMO operation.

In the HS-DSCH physical layer category table, categories are defined for typical HSDPA capabilities of a UE, which are specifically as follows:

Category 1~12 represent capability categories of a UE for supporting a single transmission channel of MAC-hs;

Category 13~20 represent capability categories of a UE for supporting a single transmission channel of MAC-ehs;

Category 21~24 represent capability categories of a UE for supporting dual transmission channels;

Category 25~28 represent capability categories of a UE for supporting dual-transmission-channel+MIMO;

Category 29 represents a capability category of a UE for supporting three transmission channels;

Category 30 represents a capability category of a UE for supporting three-transmission-channel+MIMO;

Category 31 represents a capability category of a UE for supporting four transmission channels;

Category 32 represents a capability category of a UE for supporting four-transmission channel+MIMO;

Category 33 represents a capability category of a UE for supporting six transmission channels;

Category 34 represents a capability category of a UE for supporting six-transmission channel+MIMO;

Category 35 represents a capability category of a UE for supporting eight transmission channels;

Category 36 represents a capability category of a UE for supporting eight-transmission channel+MIMO;

Category 37 represents a capability category of a UE for supporting single-transmission-channel+4*2 MIMO;

Category 38 represents a capability category of a UE for supporting single-transmission-channel+4*4 MIMO;

Category 39 represents a capability category of a UE for supporting dual-transmission-channel+4*2 MIMO;

Category 40 represents a capability category of a UE for supporting dual-transmission-channel+4*4 MIMO;

Category 41 represents a capability category of a UE for supporting four-transmission-channel+4*2 MIMO;

Category 42 represents a capability category of a UE for supporting four-transmission-channel+4*4 MIMO.

It should be noted that in a radio communications network, different UEs have different HSDPA capabilities, and different HSDPA capabilities correspond to different HS-DSCH physical layer categories; after the UE enters a network, the UE reports its HS-DSCH physical layer category to the first network device.

For example, before step 101, the user equipment (UE) may report an HS-DSCH physical layer category supported by the UE to the first network device when sending a service request to the first network device, where 37~42 are used for reporting extended capability categories of 4*2 MIMO and 4*4 MIMO. That the UE reports its HS-DSCH physical layer category to the first network device may be specifically implemented as follows:

HS-DSCH physical layer category IE: the value ranges from 1 to 64, and the actually used value ranges from 1 to 12;

HS-DSCH physical layer category extension IE: the value ranges from 1 to 20, and the actually used value ranges from 13 to 20;

HS-DSCH physical layer category extension 2 IE: the value ranges from 21 to 24;

HS-DSCH physical layer category extension 3 IE: the value ranges from 24 to 28;

HS-DSCH physical layer category extension 4 IE: the value ranges from 29 to 30;

HS-DSCH physical layer category extension 5 IE: the value ranges from 31 to 32;

HS-DSCH physical layer category extension 6 IE: the value ranges from 33 to 34;

HS-DSCH physical layer category extension 7 IE: the value ranges from 35 to 36;

HS-DSCH physical layer category extension 8 IE: the value ranges from 37 to 38;

HS-DSCH physical layer category extension 9 IE: the value ranges from 39 to 40;

HS-DSCH physical layer category extension 10 IE: the value ranges from 41 to 42.

The first network device configures, according to the HS-DSCH physical layer category reported by the UE, the UE on an HSDPA operation supported by the HS-DSCH physical layer category, and returns a first network configuration corresponding to the HSDPA operation to the UE, where the first network configuration may include but is not limited to at least one HS-DSCH transmission channel and the corresponding number of HARQ processes and/or MIMO configuration information, and the MIMO configuration information includes 2*2 MIMO and/or 4*2 MIMO and/or 4*4 MIMO.

It should be noted that in a practical application, the first network configuration sent by the first network device to the UE may include the number of HARQ processes of only one HS-DSCH transmission channel, and the UE may calculate the number of HARQ processes of another HS-DSCH transmission channel according to the first network configuration.

The UE selects an HSDPA operation according to the first network configuration. For example, when the first network device configures the UE on an HSDPA operation of four-transmission-channel+4*4 MIMO, the corresponding first network configuration includes information of four transmission channels and 4*4 MIMO configuration information.

It should be noted that, in order to guarantee subsequent data transmission quality, the UE needs to allocate memory among the HARQ processes; and in order to guarantee correctness of HARQ process memory allocation so that the number of soft channel bits obtained by each HARQ process does not exceed a maximum memory threshold of the corresponding HARQ process, before the UE allocates memory among the HARQ processes, the UE may query the HS-DSCH physical layer category table according to the transmission channel information and/or MIMO configuration information included in the first network configuration, to determine an HS-DSCH physical layer category corresponding to the first network configuration. The specific implementation may be as follows:

For example, when the HS-DSCH physical layer category reported by the UE is 34, and the first network device configures the UE on an HSDPA operation of five-transmission-channel+MIMO, in the corresponding network configuration, the transmission channel information is information of five transmission channels and the MIMO configuration information is a 2*2 MIMO operation. The HS-DSCH physical layer category table is queried according to the transmission channel information and MIMO configuration information included in the first network configuration. As the HS-DSCH physical layer category table does not have an HS-DSCH physical layer category that separately represents a five-transmission-channel+2*2 MIMO operation, in a practical application, the five-transmission-channel+2*2 MIMO operation corresponds to an HS-DSCH physical layer category of a six-transmission-channel+2*2 MIMO operation. Therefore, the UE can determine that the HS-DSCH physical layer category corresponding to the first network configuration is 34 according to the five-transmission-channel information and 2*2 MIMO information included in the first network configuration.

For another example, when the HS-DSCH physical layer category reported by the UE is 42, and the first network device configures the UE on an HSDPA operation of three-transmission-channel+4*4 MIMO, in the corresponding network configuration, the transmission channel information is three-transmission-channel and the MIMO configuration information is a 4*4 MIMO operation. The HS-DSCH physical layer category table is queried according to the transmission channel information and MIMO configuration information included in the first network configuration. As the HS-DSCH physical layer category table does not have an HS-DSCH physical layer category that separately represents a three-transmission-channel+4*4 MIMO operation, in a practical application, the three-transmission-channel+4*4 MIMO operation corresponds to an HS-DSCH physical layer category of a four-transmission-channel+4*4 MIMO operation. Therefore, the UE can determine that the HS-DSCH physical layer category corresponding to the first network configuration is 42 according to the three-transmission-channel and 4*4 MIMO operation included in the first network configuration.

102: Use the total number of soft channel bits corresponding to the determined HS-DSCH physical layer category as a total allocated memory size of a soft memory buffer, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category.

It should be noted that, the HS-DSCH physical layer category table of this embodiment further includes a soft memory buffer size of a MAC-hs/ehs entity corresponding to each HS-DSCH physical layer category, and the soft memory buffer size of the MAC-hs/ehs entity is the total number of soft channel bits corresponding to the HS-DSCH physical layer category.

103: Allocate the soft memory buffer size of each HS-DSCH transmission channel among the HARQ processes in the first network configuration of the corresponding HS-DSCH transmission channel.

It should be noted that, if the first network device configures the UE on a single-transmission-channel, a dual-transmission-channel, a three-transmission-channel, or a four-transmission-channel operation when configuring an HSDPA operation for the UE according to the HS-DSCH physical layer category reported by the UE, according to the HS-DSCH physical layer category table, the number of transmission channels (HS-DSCH transmission channels) configured by the network device for the UE is equal to the number of transmission channels (serving/secondary serving HS-DSCH cells) corresponding to the HS-DSCH physical layer category reported by the UE; therefore, no error occurs during the subsequent HARQ process memory allocation.

However, if the first network device configures the UE on a five-transmission-channel or seven-transmission-channel operation when configuring an HSDPA operation for the UE according to the HS-DSCH physical layer category reported by the UE, according to the HS-DSCH physical layer category table, the number of transmission channels (HS-DSCH transmission channels) configured by the network device for the UE may be not equal to the number of transmission channels (serving/secondary serving HS-DSCH cells) corresponding to the HS-DSCH physical layer category reported by the UE. When the number of transmission channels (HS-DSCH transmission channels) configured by the network device for the UE is not equal to the number of transmission channels (serving/secondary serving HS-DSCH cells) corresponding to the HS-DSCH physical layer category reported by the UE, an error occurs during the subsequent HARQ process memory allocation.

In order to reduce errors in the subsequent HARQ process memory allocation, in an optional implementation manner of the present invention, in step 102, the UE determines, according to the HS-DSCH physical layer category obtained in step 101, a soft memory buffer size of a MAC-hs/ehs entity (the total number of soft channel bits of the soft memory buffer of the MAC-hs/ehs entity) and the number of transmission channels corresponding to the HS-DSCH physical layer category, and divides the total number of soft channel bits by the number of transmission channels corresponding to the HS-DSCH physical layer category, to obtain the number of soft channel bits of each transmission channel. It can be known that in the embodiment of the present invention, when the number of soft channel bits of each transmission channel is determined, according to the number of transmission channels (serving/secondary serving HS-DSCH cells) corresponding to the HS-DSCH physical layer category determined by the UE, the obtained total number of soft channel bits of the soft memory buffer of the MAC-hs/ehs entity is allocated among the transmission channels corresponding to the HS-DSCH physical layer category. That is, the soft memory buffer size of each HS-DSCH transmission channel is obtained by dividing the total allocated memory size of the soft memory buffer by the total number of serving or secondary serving HS-DSCH cells corresponding to the determined HS-DSCH physical layer category, rather than allocating the obtained total number of soft channel bits of the soft memory buffer of the MAC-hs/ehs entity among the actually configured HS-DSCH transmission channels according to the number of transmission channels actually configured by the first network device to the UE.

For example, the HS-DSCH physical layer category reported by the UE is 34, indicating that the UE can support a six-transmission-channel+2*2 MIMO operation; if the first network device configures the UE to work at a five-transmission-channel+2*2 MIMO operation, the UE queries the HS-DSCH physical layer category table according to the five-transmission-channel+2*2 MIMO operation in the first network configuration, to determine that an HS-DSCH physical layer category corresponding to the five-transmission-channel+2*2 MIMO operation is 34.

After the HS-DSCH physical layer category table is queried according to the determined HS-DSCH physical layer category 34, it can be determined that the total number of soft channel bits of the soft memory buffer of the MAC-hs/ehs entity corresponding to the HS-DSCH physical layer category 34 is 3110400, and that the number of transmission channels (serving/secondary serving HS-DSCH cells) corresponding to the HS-DSCH physical layer category 34 is 6. The total number of soft channel bits is allocated among the transmission channels corresponding to the HS-DSCH physical layer category 34. In other words, the total number of soft channel bits 3110400 is divided by the number of transmission channels 6 corresponding to the HS-DSCH physical layer category 34, that is, 3110400/6=518400; therefore, it is acquired that the number of soft channel bits of each transmission channel is 518400.

The UE evenly allocates the number of soft channel bits 518400 of each transmission channel among the HARQ processes corresponding to each transmission channel. It is assumed that the number of HARQ processes configured for each transmission channel is 12. The number of soft channel bits 518400 of each transmission channel is divided by the number of HARQ processes corresponding to each transmission channel, thereby acquiring that the number of soft channel bits obtained by each HARQ process is 518400/12=43200.

It should be noted that, if the first network device configures the UE on a multi-transmission-channel operation when configuring an HSDPA operation for the UE according to the HS-DSCH physical layer category reported by the UE, where some transmission channels are configured with a 4*4 MIMO operation, and other transmission channels are configured with a 4*2 MIMO or 2*2 MIMO operation or not configured with a MIMO operation, an error may also occur during the subsequent HARQ process memory allocation.

In an optional implementation manner of the present invention, the first network configuration includes at least two HS-DSCH transmission channels and the corresponding multi-input multi-output MIMO information, and the allocating the memory size of each HS-DSCH transmission channel among the HARQ processes configured for the corresponding HS-DSCH transmission channel may be specifically implemented as follows:

If the UE supports the 4*4 MIMO operation, and it is determined that one HS-DSCH transmission channel of the two HS-DSCH transmission channels is configured with the 4*4 MIMO operation while the other HS-DSCH transmission channel is not configured with the 4*4 MIMO operation, and it is determined that the number of HARQ processes corresponding to the HS-DSCH transmission channel configured with the 4*4 MIMO operation is double the number of HARQ processes corresponding to the HS-DSCH transmission channel not configured with the 4*4 MIMO operation, the memory size of each HS-DSCH transmission channel is divided by the number of HARQ processes corresponding to the HS-DSCH transmission channel configured with the 4*4 MIMO operation, to obtain a memory size of each HARQ process corresponding to the HS-DSCH transmission channel configured with the 4*4 MIMO operation; and half of the memory size of each HARQ process corresponding to the HS-DSCH transmission channel configured with the 4*4 MIMO operation is determined as a memory size of each HARQ process corresponding to the HS-DSCH transmission channel not configured with the 4*4 MIMO operation.

If the UE supports the 4*4 MIMO operation, and it is determined that one HS-DSCH transmission channel of the two HS-DSCH transmission channels is configured with the 4*4 MIMO operation while the other HS-DSCH transmission channel is not configured with the 4*4 MIMO operation, and it is determined that the number of HARQ processes corresponding to the HS-DSCH transmission channel configured with the 4*4 MIMO operation is quadruple the number of HARQ processes corresponding to the HS-DSCH transmission channel not configured with the 4*4 MIMO operation, the memory size of each HS-DSCH transmission channel is divided by the number of HARQ processes corresponding to the HS-DSCH transmission channel configured with the 4*4 MIMO operation, to obtain a memory size of each HARQ process corresponding to the HS-DSCH transmission channel configured with the 4*4 MIMO operation; and the memory size of each HARQ process corresponding to the HS-DSCH transmission channel configured with the 4*4 MIMO operation is determined as a memory size of each HARQ process corresponding to the HS-DSCH transmission channel not configured with the 4*4 MIMO operation.

If the UE supports the 4*4 MIMO operation, and it is determined that one HS-DSCH transmission channel of the two HS-DSCH transmission channels is configured with a 4*2 MIMO operation while the other HS-DSCH transmission channel is not configured with the 4*2 MIMO operation, and it is determined that the number of HARQ processes corresponding to the HS-DSCH transmission channel configured with the 4*2 MIMO operation is double the number of HARQ processes corresponding to the HS-DSCH transmission channel not configured with the 4*2 MIMO operation, half of the memory size of each HS-DSCH transmission channel is divided by the number of HARQ processes corresponding to the HS-DSCH transmission channel configured with the 4*2 MIMO operation, to obtain a memory size of each HARQ process corresponding to the HS-DSCH transmission channel configured with the 4*2 MIMO operation; and the memory size of each HARQ process corresponding to the HS-DSCH transmission channel configured with the 4*2 MIMO operation is determined as a memory size of each HARQ process corresponding to the HS-DSCH transmission channel not configured with the 4*2 MIMO operation.

If the UE does not support the 4*4 MIMO operation, and it is determined that one HS-DSCH transmission channel of the two HS-DSCH transmission channels is configured with a 4*2 MIMO operation while the other HS-DSCH transmission channel is not configured with the 4*2 MIMO operation, and it is determined that the number of HARQ processes corresponding to the HS-DSCH transmission channel configured with the 4*2 MIMO operation is double the number of HARQ processes corresponding to the HS-DSCH transmission channel not configured with the 4*2 MIMO operation, the memory size of each HS-DSCH transmission channel is divided by the number of HARQ processes corresponding to the HS-DSCH transmission channel configured with the 4*2 MIMO operation, to obtain a memory size of each HARQ process corresponding to the HS-DSCH transmission channel configured with the 4*2 MIMO operation; and the memory size of each HARQ process corresponding to the HS-DSCH transmission channel configured with the 4*2 MIMO operation is determined as a memory size of each HARQ process corresponding to the HS-DSCH transmission channel not configured with the 4*2 MIMO operation.

For example, the HS-DSCH physical layer category reported by the UE is 42, indicating that the UE can support a four-transmission-channel+4*4 MIMO operation. If the first network device configures the UE to work at a three-transmission-channel+4*4 MIMO operation, the UE queries the HS-DSCH physical layer category table according to the three-transmission-channel+4*4 MIMO operation in the first network configuration, to determine that an HS-DSCH physical layer category corresponding to the three-transmission-channel+4*4 MIMO operation is 42. After the HS-DSCH physical layer category table is queried, it can be determined that the total number of soft channel bits of a soft memory buffer of a MAC-hs/ehs entity corresponding to the HS-DSCH physical layer category 42 is 4147200, and that the number of transmission channels corresponding to the HS-DSCH physical layer category 42 is 4. The total number of soft channel bits 4147200 is allocated among four transmission channels, that is, 4147200/4=1036800, to acquire that the number of soft channel bits of each transmission channel is 1036800. It is assumed that the number of HARQ processes configured for each transmission channel in the 4*4 MIMO operation is the same as the number of HARQ processes configured for each transmission channel in the MIMO operation, and it is assumed that the number of HARQ processes configured for each transmission channel is 12. The number of soft channel bits 1036800 of each transmission channel is divided by the number of HARQ processes 12 corresponding to each transmission channel, thereby acquiring that the number of soft channel bits obtained by each HARQ process is 1036800/12=86400.

For another example, the HS-DSCH physical layer category reported by the UE is 42, indicating that the UE can support a four-transmission-channel+4*4 MIMO operation. If the first network device configures the UE to work at three transmission channels, but only two transmission channels are configured with 4*4 MIMO, after the HS-DSCH physical layer category table is queried according to the three-transmission-channel information and 4*4 MIMO in the first network configuration, it can be determined that an HS-DSCH physical layer category corresponding to the first network configuration is 42, thereby acquiring that the total number of soft channel bits of the soft memory buffer of the MAC-hs/ehs entity corresponding to the HS-DSCH physical layer category 42 is 4147200; and it can also be determined that the number of transmission channels corresponding to the HS-DSCH physical layer category 42 is 4. The total number of soft channel bits 4147200 is allocated among four transmission channels, that is, 4147200/4=1036800, to acquire that the number of soft channel bits of each transmission channel is 1036800. For the transmission channels configured with 4*4 MIMO, it is assumed that the number of HARQ processes configured for each transmission channel is 12. Then, for the transmission channels configured with 4*4 MIMO, the number of soft channel bits obtained by each HARQ process is 1036800/12=86400; and for the transmission channel not configured with 4*4 MIMO, the number of soft channel bits obtained by each HARQ process is half of the number of soft channel bits obtained by each HARQ process corresponding to the transmission channel configured with 4*4 MIMO, that is, 86400/2=43200.

It should be noted that in a practical application, for the 4*4 MIMO operation, at each data transmitting moment, four transmission blocks can be transmitted; for the 4*2 MIMO and MIMO operation, at each data transmitting moment, two transmission blocks can be transmitted. Therefore, the total number of soft channel bits that can be obtained by a UE supporting 4*4 MIMO should be double the total number of soft channel bits that can be obtained by a UE supporting the MIMO operation, that is, 2073600*2=4147200.

A data volume transmitted by each HARQ process in the 4*4 MIMO operation becomes double of a data volume transmitted by each HARQ process in the 2*2 MIMO operation. Therefore, in the 4*4 MIMO operation, when the number of HARQ processes configured for each transmission channel in the 4*4 MIMO operation is the same as the number of HARQ processes configured for each transmission channel in the 2*2 MIMO operation, the maximum memory threshold of each HARQ process can be set to 86400 bits. That is to say, in the 4*4 MIMO operation, as long as the number of soft channel bits obtained by each HARQ process does not exceed 86400, it can be ensured that no error occurs in the HARQ process memory allocation, thereby guaranteeing data transmission quality.

For another example, the HS-DSCH physical layer category reported by the UE is 41, indicating that the UE can support a four-transmission-channel+4*2 MIMO operation. If the first network device configures the UE to work at a three-transmission-channel+4*2 MIMO operation, the UE queries the HS-DSCH physical layer category table according to the first network configuration, to determine that an HS-DSCH physical layer category corresponding to the three-transmission-channel+4*2 MIMO operation is 41. After the HS-DSCH physical layer category table is queried, it can be determined that the total number of soft channel bits of the soft memory buffer of the MAC-hs/ehs entity corresponding to the HS-DSCH physical layer category 41 is 2073600, and that the number of transmission channels corresponding to the HS-DSCH physical layer category 41 is 4. The total number of soft channel bits 2073600 is allocated among four transmission channels, that is, 2073600/4=51840, to acquire that the number of soft channel bits of each transmission channel is 518400. It is assumed that the number of HARQ processes configured for each transmission channel in the 4*2 MIMO operation is the same as the number of HARQ processes configured for each transmission channel in the MIMO operation, and it is assumed that the number of HARQ processes configured for each transmission channel is 12. The number of soft channel bits 518400 of each transmission channel is divided by the number of HARQ processes 12 corresponding to each transmission channel, thereby acquiring that the number of soft channel bits obtained by each HARQ process is 518400/12=43200.

For another example, the HS-DSCH physical layer category reported by the UE is 41, indicating that the UE can support a four-transmission-channel+4*2 MIMO operation. If the first network device configures the UE to work at three transmission channels, but only two transmission channels are configured with 4*2 MIMO, the UE queries the HS-DSCH physical layer category table according to the first network configuration, to determine that an HS-DSCH physical layer category corresponding to the three-transmission-channel+4*2 MIMO operation is 41. After the HS-DSCH physical layer category table is queried, it can be determined that the total number of soft channel bits of the soft memory buffer of the MAC-hs/ehs entity corresponding to the HS-DSCH physical layer category 41 is 2073600, and that the number of transmission channels corresponding to the HS-DSCH physical layer category 41 is 4. The total number of soft channel bits 2073600 is allocated among four transmission channels, that is, 2073600/4=518400, to acquire that the number of soft channel bits of each transmission channel is 518400. For the transmission channels configured with 4*2 MIMO, it is assumed that the number of HARQ processes configured for each transmission channel is 12, and then the number of soft channel bits obtained by each HARQ process is 518400/12=43200; and for the transmission channel not configured with 4*2 MIMO, it is assumed that the number of HARQ processes configured for each transmission channel is 12, and then the number of soft channel bits obtained by each HARQ process is 518400/12=43200.

For another example, the HS-DSCH physical layer category reported by the UE is 42, indicating that the UE can support a four-transmission-channel+4*4 MIMO operation. If the first network device configures the UE to work at three transmission channels, but only two transmission channels are configured with 4*2 MIMO, the UE queries the HS-DSCH physical layer category table according to the first network configuration, to determine that an HS-DSCH physical layer category corresponding to the three-transmission-channel+4*2 MIMO operation is 42. After the HS-DSCH physical layer category table is queried, it can be determined that the total number of soft channel bits of the soft memory buffer of the MAC-hs/ehs entity corresponding to the HS-DSCH physical layer category 42 is 4147200, and that the number of transmission channels corresponding to the HS-DSCH physical layer category 42 is 4. The total number of soft channel bits 2073600 is allocated among four transmission channels, that is, 4147200/4=1036800, to acquire that the number of soft channel bits of each transmission channel is 1036800. For the transmission channels configured with 4*2 MIMO, half of the memory of each transmission channel is allocated among the HARQ processes; and if it is assumed that the number of HARQ processes configured for each transmission channel is 12, the number of soft channel bits obtained by each HARQ process is (1036800/2)/12=43200. For the transmission channel not configured with 4*2 MIMO, the number of soft channel bits obtained by each HARQ process is the number of soft channel bits obtained by each HARQ process in the transmission channel configured with 4*2 MIMO, that is, 43200.

It should be noted that in a practical application, a data volume transmitted by each HARQ process in the 4*2 MIMO operation is the same as a data volume transmitted by each HARQ process in the 2*2 MIMO operation. Therefore, in the 4*2 MIMO operation, when the number of HARQ processes configured for each transmission channel in the 4*2 MIMO operation is the same as the number of HARQ processes configured for each transmission channel in the 2*2 MIMO operation, the maximum memory threshold of each HARQ process can be set to 43200 bits. That is to say, in the 4*2 MIMO operation, as long as the number of soft channel bits obtained by each HARQ process does not exceed 43200, it can be ensured that no error occurs in the HARQ process memory allocation, thereby guaranteeing data transmission quality.

In an optional implementation manner of the present invention, it is assumed that the number of HARQ processes configured for each transmission channel in the 4*4 MIMO operation is double the number of HARQ processes configured for each transmission channel in the 2*2 MIMO operation. For example, the HS-DSCH physical layer category reported by the UE is 42, indicating that the UE can support a four-transmission-channel+4*4 MIMO operation. If the first network device configures the UE to work at the three-transmission-channel+4*4 MIMO operation, the UE queries the HS-DSCH physical layer category table according to the three-transmission-channel+4*4 MIMO operation in the first network configuration, to determine that an HS-DSCH physical layer category corresponding to the three-transmission-channel+4*4 MIMO operation is 42. After the HS-DSCH physical layer category table is queried, it can be determined that the total number of soft channel bits of the soft memory buffer of the MAC-hs/ehs entity corresponding to the HS-DSCH physical layer category 42 is 4147200, and that the number of transmission channels corresponding to the HS-DSCH physical layer category 42 is 4. The total number of soft channel bits 4147200 is allocated among four transmission channels, that is, 4147200/4=1036800, to acquire that the number of soft channel bits of each transmission channel is 1036800. It is assumed that the number of HARQ processes configured for each transmission channel in the 4*4 MIMO operation is 24. The number of soft channel bits 1036800 of each transmission channel is divided by the number of HARQ processes 24 corresponding to each transmission channel, thereby acquiring that the number of soft channel bits obtained by each HARQ process is 1036800/24=43200.

For another example, the HS-DSCH physical layer category reported by the UE is 42, indicating that the UE can support a four-transmission-channel+4*4 MIMO operation. If the first network device configures the UE to work at three transmission channels, but only two transmission channels are configured with 4*4 MIMO, after the HS-DSCH physical layer category table is queried according to the three-transmission-channel information and 4*4 MIMO in the first network configuration, it can be determined that an HS-DSCH physical layer category corresponding to the first network configuration is 42, thereby acquiring that the total number of soft channel bits of the soft memory buffer of the MAC-hs/ehs entity corresponding to the HS-DSCH physical layer category 42 is 4147200; and it can also be determined that the number of transmission channels corresponding to the HS-DSCH physical layer category 42 is 4. The total number of soft channel bits 4147200 is allocated among four transmission channels, that is, 4147200/4=1036800, to acquire that the number of soft channel bits of each transmission channel is 1036800. For the transmission channels configured with 4*4 MIMO, it is assumed that the number of HARQ processes configured for each transmission channel is 24, and then for the transmission channel configured with 4*4 MIMO, the number of soft channel bits obtained by each HARQ process is 1036800/24=43200; and for the transmission channel not configured with 4*4 MIMO, as the number of HARQ processes configured for each transmission channel is 24, the number of soft channel bits obtained by each HARQ process is also 1036800/24=43200.

For another example, the HS-DSCH physical layer category reported by the UE is 42, indicating that the UE can support a four-transmission-channel+4*4 MIMO operation. If the first network device configures the UE to work at three transmission channels, but only two transmission channels are configured with 4*2 MIMO, the UE queries the HS-DSCH physical layer category table according to the first network configuration, to determine that an HS-DSCH physical layer category corresponding to the three-transmission-channel+4*2 MIMO operation is 42. After the HS-DSCH physical layer category table is queried, it can be determined that the total number of soft channel bits of the soft memory buffer of the MAC-hs/ehs entity corresponding to the HS-DSCH physical layer category 42 is 4147200, and that the number of transmission channels corresponding to the HS-DSCH physical layer category 42 is 4. The total number of soft channel bits 4147200 is allocated among four transmission channels, that is, 4147200/4=1036800, to acquire that the number of soft channel bits of each transmission channel is 1036800. For the transmission channels configured with 4*2 MIMO, half of the memory of each transmission channel is allocated among the HARQ processes; and if it is assumed that the number of HARQ processes configured for each transmission channel is 12, the number of soft channel bits obtained by each HARQ process is (1036800/2)/12=43200. Alternatively, according to a case in which 4*4 MIMO is configured, the memory of each transmission channel is allocated among the HARQ processes; and if it is assumed that the number of HARQ processes configured for each transmission channel is 12, the number of soft channel bits obtained by each HARQ process is 1036800/24=43200. Finally, for the transmission channel not configured with 4*2 MIMO, the number of soft channel bits obtained by each HARQ process is the number of soft channel bits obtained by each HARQ process in the transmission channel configured with 4*2 MIMO, that is, 43200.

It should be noted that if the number of HARQ processes configured for each transmission channel in the 4*4 MIMO operation is double the number of HARQ processes configured for each transmission channel in the 2*2 MIMO operation, in this case, because a data volume transmitted by each HARQ process in the 4*4 MIMO operation is the same as a data volume transmitted by each HARQ process in the 2*2 MIMO operation, the maximum memory threshold of each HARQ process is 43200 bits. That is to say, if the number of HARQ processes configured for each transmission channel in the 4*4 MIMO operation is double the number of HARQ processes configured for each transmission channel in the 2*2 MIMO operation, as long as the number of soft channel bits obtained by each HARQ process does not exceed 43200, it can be ensured that no error occurs in the HARQ process memory allocation, thereby guaranteeing data transmission quality.

The UE in the embodiment of the present invention can determine, according to a first network configuration, an HS-DSCH physical layer category corresponding to the first network configuration; obtain the total number of soft channel bits for memory allocation according to the determined HS-DSCH physical layer category, and divide the total number of soft channel bits by the total number of serving or secondary serving HS-DSCH cells corresponding to the determined HS-DSCH physical layer category, to obtain a memory size of each HS-DSCH transmission channel; and allocate the memory size of each HS-DSCH transmission channel among HARQ processes configured for the corresponding HS-DSCH transmission channel in the first network configuration. In this way, it can be ensured that when the number of transmission channels configured by a first network device for the UE is not equal to the number of transmission channels corresponding to the HS-DSCH physical layer category, the UE determines the memory size of each transmission channel according to the number of transmission channels corresponding to the HS-DSCH physical layer category, rather than determining a soft channel memory size of each transmission channel according to the number of transmission channels actually configured by the first network device. Therefore, it is ensured that the number of soft channel bits obtained by each HARQ process does not exceed a maximum memory threshold of the corresponding HARQ process, thereby reducing errors in HARQ process memory allocation, and guaranteeing data transmission quality.

Figure 2:
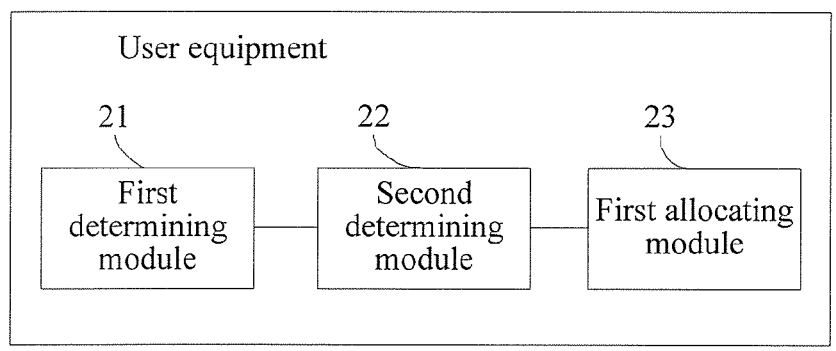
FIG. 2 is a schematic structural diagram of a user equipment according to another embodiment of the present invention.

FIG. 2 is a schematic structural diagram of a user equipment according to another embodiment of the present invention. As shown in FIG. 2, the user equipment specifically includes:

a first determining module 21, configured to determine a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes;

a second determining module 22, configured to use the total number of soft channel bits corresponding to the determined HS-DSCH physical layer category as a total allocated memory size of a soft memory buffer based on the HS-DSCH physical layer category determined by the first determining module, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and a first allocating module 23, configured to allocate the soft memory buffer size of each HS-DSCH transmission channel among the HARQ processes in the first network configuration of the corresponding HS-DSCH transmission channel based on the soft memory buffer size of each HS-DSCH transmission channel determined by the second determining module.

It should be noted that the first network configuration further includes multiple-input multiple-output (MIMO) configuration information, and the MIMO configuration information includes 2*2 MIMO and/or 4*2 MIMO and/or 4*4 MIMO. Each HS-DSCH transmission channel is an HS-DSCH transmission channel configured by the first network device; and the total number of serving or secondary serving HS-DSCH cells corresponding to the determined HS-DSCH physical layer category is the total number of HS-DSCH transmission channels supported by the UE, or the total number of HS-DSCH transmission channels that can be configured by the first network device at most.

It should be noted that if the UE configures 4*4 MIMO on some or all of the HS-DSCH transmission channels, the first allocating module 23 is specifically configured to:

for each HS-DSCH transmission channel configured with 4*4 MIMO, allocate the soft memory buffer among the HARQ processes in the first network configuration; or for an HS-DSCH transmission channel not configured with 4*4 MIMO, use an HARQ process memory value calculated based on an HS-DSCH channel configured with a 4*4 MIMO operation; or for an HS-DSCH transmission channel not configured with 4*4 MIMO, use half of an HARQ process memory value calculated based on an HS-DSCH channel configured with a 4*4 MIMO operation.

It should be noted that if the UE supports 4*4 MIMO, and the UE configures 4*2 MIMO on some or all of the HS-DSCH transmission channels, the first allocating module 23 is specifically configured to:

for each HS-DSCH transmission channel configured with 4*2 MIMO, allocate half of the memory of the soft memory buffer among the hybrid automatic repeat request (HARQ) processes in the first network configuration; or for each HS-DSCH transmission channel configured with 4*2 MIMO, according to a case in which 4*4 MIMO is configured, allocate the soft memory buffer among the configured hybrid automatic repeat request (HARQ) processes; or for an HS-DSCH transmission channel not configured with 4*2 MIMO, use an HARQ process memory value calculated based on an HS-DSCH channel configured with a 4*2 MIMO operation.

It should be noted that if the UE does not support 4*4 MIMO, and the UE configures 4*2 MIMO on some or all of the HS-DSCH transmission channels, the first allocating module 23 is specifically configured to:

for each HS-DSCH transmission channel configured with 4*2 MIMO, allocate the soft memory buffer among the hybrid automatic repeat request (HARQ) processes in the first network configuration; or, for an HS-DSCH transmission channel not configured with 4*2 MIMO, use an HARQ process memory value calculated based on an HS-DSCH channel configured with a 4*2 MIMO operation.

In an implementation manner of the present invention, the first allocating module 23 is specifically configured to, if it is determined that one HS-DSCH transmission channel of the two HS-DSCH transmission channels is configured with the 4*4 MIMO operation while the other HS-DSCH transmission channel is not configured with the 4*4 MIMO operation, and it is determined that the number of HARQ processes corresponding to the HS-DSCH transmission channel configured with the 4*4 MIMO operation is double the number of HARQ processes corresponding to the HS-DSCH transmission channel not configured with the 4*4 MIMO operation, divide the memory size of each HS-DSCH transmission channel by the number of HARQ processes corresponding to the HS-DSCH transmission channel configured with the 4*4 MIMO operation, to obtain a memory size of each HARQ process corresponding to the HS-DSCH transmission channel configured with the 4*4 MIMO operation; and determine half of the memory size of each HARQ process corresponding to the HS-DSCH transmission channel configured with the 4*4 MIMO operation as a memory size of each HARQ process corresponding to the HS-DSCH transmission channel not configured with the 4*4 MIMO operation.

In an implementation manner of the present invention, the first allocating module 23 is specifically configured to, if it is determined that one HS-DSCH transmission channel of the two HS-DSCH transmission channels is configured with the 4*4 MIMO operation while the other HS-DSCH transmission channel is not configured with the 4*4 MIMO operation, and it is determined that the number of HARQ processes corresponding to the HS-DSCH transmission channel configured with the 4*4 MIMO operation is quadruple the number of HARQ processes corresponding to the HS-DSCH transmission channel not configured with the 4*4 MIMO operation, divide the memory size of each HS-DSCH transmission channel by the number of HARQ processes corresponding to the HS-DSCH transmission channel configured with the 4*4 MIMO operation, to obtain a memory size of each HARQ process corresponding to the HS-DSCH transmission channel configured with the 4*4 MIMO operation; and determine the memory size of each HARQ process corresponding to the HS-DSCH transmission channel configured with the 4*4 MIMO operation as a memory size of each HARQ process corresponding to the HS-DSCH transmission channel not configured with the 4*4 MIMO operation.

In an implementation manner of the present invention, the first allocating module 23 is specifically configured to, if it is determined that one HS-DSCH transmission channel of the two HS-DSCH transmission channels is configured with the 4*2 MIMO operation while the other HS-DSCH transmission channel is not configured with the 4*2 MIMO operation, and it is determined that the number of HARQ processes corresponding to the HS-DSCH transmission channel configured with the 4*2 MIMO operation is double the number of HARQ processes corresponding to the HS-DSCH transmission channel not configured with the 4*2 MIMO operation, divide the memory size of each HS-DSCH transmission channel by the number of HARQ processes corresponding to the HS-DSCH transmission channel configured with the 4*2 MIMO operation, to obtain a memory size of each HARQ process corresponding to the HS-DSCH transmission channel configured with the 4*2 MIMO operation; and determine the memory size of each HARQ process corresponding to the HS-DSCH transmission channel configured with the 4*2 MIMO operation as a memory size of each HARQ process corresponding to the HS-DSCH transmission channel not configured with the 4*2 MIMO operation.

For the specific implementation principles of the first determining module 21, the second determining module 22, and the first allocating module 23, reference may be made to related descriptions in the method embodiment shown in FIG. 1, and details are not described herein again.

In the UE of the embodiment of the present invention, a first determining module can determine a HS-DSCH physical layer category corresponding to a first network configuration; a second determining module obtains, according to the determined HS-DSCH physical layer category, the total number of soft channel bits corresponding to the determined HS-DSCH physical layer category, and divides the total number of soft channel bits by the total number of serving or secondary serving HS-DSCH cells corresponding to the determined HS-DSCH physical layer category, to obtain a memory size of each HS-DSCH transmission channel; and the first allocating module can allocate the memory size of each transmission channel among HARQ processes configured for each transmission channel. In this way, it can be ensured that when the number of transmission channels configured by a first network device for the UE is not equal to the number of transmission channels corresponding to the HS-DSCH physical layer category, the UE determines the memory size of each transmission channel according to the number of transmission channels corresponding to the HS-DSCH physical layer category, rather than determining the memory size of each transmission channel according to the number of transmission channels actually configured by the network device. Therefore, it can be ensured that a memory size obtained by each HARQ process does not exceed a maximum memory threshold of the corresponding HARQ process, thereby reducing errors in HARQ process memory allocation, and guaranteeing data transmission quality.

In a radio communications system, to ensure that a UE decodes downlink data correctly, for a same HARQ process, the UE and a base station should have a HARQ process memory of a same size, and furthermore, the number of HARQ processes and the memory size of each process which are maintained by the base station should be consistent with those maintained by the UE.

Figure 3:
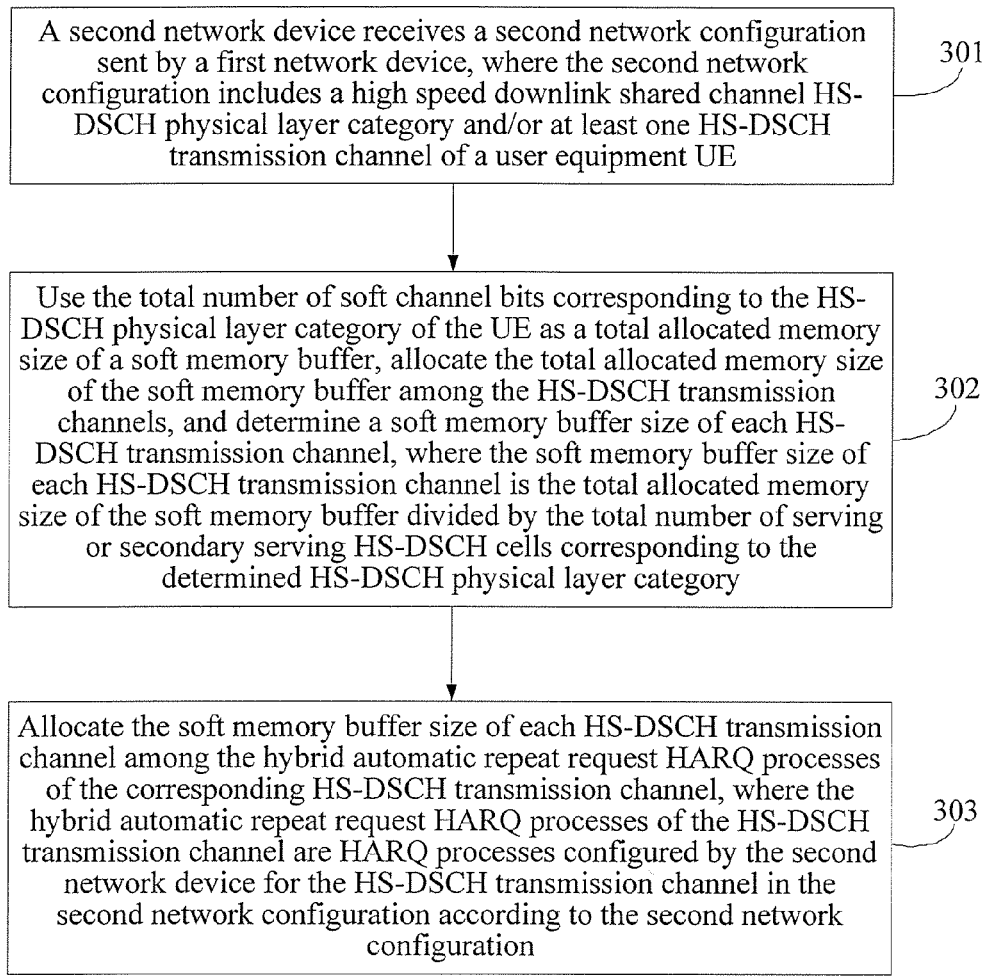
FIG. 3 is a schematic flow chart of a memory allocation method according to another embodiment of the present invention.

Based on an extended HS-DSCH physical layer category standard, another embodiment of the present invention provides a memory allocation method from a network device side. FIG. 3 is a schematic flow chart of a memory allocation method according to another embodiment of the present invention. As shown in FIG. 3, the method specifically includes:

301: A second network device receives a second network configuration sent by a first network device, where the second network configuration includes a high speed downlink shared channel (HS-DSCH) physical layer category and/or at least one HS-DSCH transmission channel of a user equipment (UE).

In a radio communications network, different UEs have different HSDPA capabilities, and different HSDPA capabilities correspond to different HS-DSCH physical layer categories. After a UE enters the network, the UE reports its HS-DSCH physical layer category to the first network device (for example, an RNC). The first network device sends the HS-DSCH physical layer category reported by the UE to the second network device (for example, a base station Node B) through the second network configuration, where the second network configuration further includes at least one HS-DSCH transmission channel and/or multiple-input multiple-output (MIMO) configuration information, and the MIMO configuration information includes 2*2 MIMO and/or 4*2 MIMO and/or 4*4 MIMO.

It should be noted that, in order to ensure that the number of HARQ processes and a memory size of each process which are configured on the user equipment side are the same as those configured on the network side, the number of HS-DSCH transmission channels included in the second network configuration is the same as the number of HS-DSCH transmission channels in the first network configuration sent by the first network device to the UE.

302: Use the total number of soft channel bits corresponding to the HS-DSCH physical layer category of the UE as a total allocated memory size of a soft memory buffer, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category.

In order to reduce errors in the subsequent HARQ process memory allocation, in an optional implementation manner of the present invention, in step 302, according to a soft memory buffer size of a MAC-hs/ehs entity (the total number of soft channel bits of a soft memory buffer of a MAC-hs/ehs entity) and the total number of serving/secondary serving HS-DSCH cells corresponding to the HS-DSCH physical layer category of the UE, the second network device divides the total number of soft channel bits by the total number of serving/secondary serving HS-DSCH cells corresponding to the HS-DSCH physical layer category, to obtain the number of soft channel bits of each transmission channel. It can be known that in the embodiment of the present invention, the number of soft channel bits of each transmission channel is determined by allocating, according to the total number of serving/secondary serving HS-DSCH cells corresponding to the HS-DSCH physical layer category of the UE, the obtained total number of soft channel bits of the soft memory buffer of the MAC-hs/ehs entity among the serving/secondary serving HS-DSCH cells corresponding to the HS-DSCH physical layer category, not by allocating the obtained total number of soft channel bits of the soft memory buffer of the MAC-hs/ehs entity among the actually configured HS-DSCH transmission channels according to the number of transmission channels actually configured by the first network device for the UE or the second network device.

303: Allocate the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the second network device for the HS-DSCH transmission channel in the second network configuration according to the second network configuration.

It should be noted that, in order to ensure that the number of the HARQ processes and the memory size of each process which are configured on the user equipment side are the same as those configured on the network side, the second network device may configure the number of HARQ processes of each HS-DSCH transmission channel according to the second network configuration sent by the first network device, and send the number of HARQ processes of each HS-DSCH transmission channel configured by the second network device to the first network device, so that the first network device sends the number of HARQ processes of each HS-DSCH transmission channel configured by the second network device to the UE through the first network configuration.

It should be noted that the second network device may also configure the number of HARQ processes of one of the HS-DSCH transmission channels according to the second network configuration sent by the first network device, and the numbers of HARQ processes of other HS-DSCH transmission channels may be calculated according to the second network configuration. Correspondingly, the second network device may send the number of HARQ processes of only one HS-DSCH transmission channel to the first network device. Correspondingly, the first network device may send the number of HARQ processes of only one HS-DSCH transmission channel to the UE, and the UE may calculate the numbers of HARQ processes of other HS-DSCH transmission channels according to the first network configuration.

It should be noted that each HS-DSCH transmission channel is an HS-DSCH transmission channel configured by the first network device; and the total number of serving or secondary serving HS-DSCH cells corresponding to the HS-DSCH physical layer category is the total number of HS-DSCH transmission channels supported by the UE, or the total number of HS-DSCH transmission channels that can be configured by the first network device at most.

It should be noted that because the number of the HARQ processes and the memory size of each process which are configured on the user equipment side are the same as those configured on the network side, the specific implementation process in which the second network device allocates the soft memory buffer size of each HS-DSCH transmission channel among HARQ processes of the corresponding HS-DSCH transmission channel is the same as the process in which the user equipment allocates the soft memory buffer size of each HS-DSCH transmission channel among the HARQ processes of the corresponding HS-DSCH transmission channel. For the specific implementation process, reference may be made to the related content in the embodiment shown in FIG. 1, and details are not described herein again.

The second network device of the embodiment of the present invention obtains the total number of soft channel bits for memory allocation according to an HS-DSCH physical layer category of a UE included in a second network configuration sent by a first network device, and divides the total number of soft channel bits by the total number of serving or secondary serving HS-DSCH cells corresponding to the HS-DSCH physical layer category of the UE, to obtain a memory size of each HS-DSCH transmission channel; and allocates the memory size of each HS-DSCH transmission channel among HARQ processes of the corresponding HS-DSCH transmission channel. In this way, it can be ensured that when the number of transmission channels actually configured by the first network device is not equal to the number of transmission channels corresponding to the HS-DSCH physical layer category of the UE, the memory size of each transmission channel can be determined according to the number of transmission channels corresponding to the HS-DSCH physical layer category, rather than a soft channel memory size of each transmission channel is determined according to the number of transmission channels actually configured by the network device. Therefore, it is ensured that the number of soft channel bits obtained by each HARQ process does not exceed a maximum memory threshold of the corresponding HARQ process, thereby reducing errors in HARQ process memory allocation, and guaranteeing data transmission quality.

Figure 4:
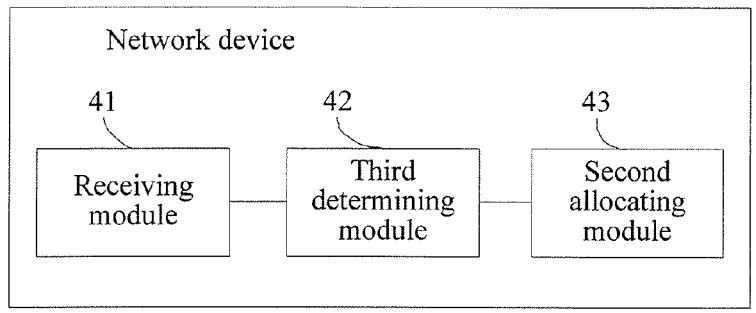
FIG. 4 is a schematic structural diagram of a network device according to another embodiment of the present invention.

FIG. 4 is a schematic structural diagram of a network device according to another embodiment of the present invention. As shown in FIG. 4, the network device specifically includes:

a receiving module 41, configured to receive a second network configuration sent by another network device, where the second network configuration includes a high speed downlink shared channel (HS-DSCH) physical layer category and/or at least one HS-DSCH transmission channel of a user equipment (UE);

a third determining module 42, configured to use the total number of soft channel bits corresponding to the HS-DSCH physical layer category of the UE as a total allocated memory size of a soft memory buffer according to the HS-DSCH physical layer category of the UE received by the receiving module, allocate the total allocated memory size of the soft memory buffer among the HS-DSCH transmission channels, and determine a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and a second allocating module 43, configured to allocate the soft memory buffer size of each HS-DSCH transmission channel among HARQ processes of the corresponding HS-DSCH transmission channel, where the HARQ processes of the HS-DSCH transmission channel are HARQ processes configured by the network device for the HS-DSCH transmission channel in the second network configuration according to the second network configuration.

It should be noted that the second network configuration further includes multiple-input multiple-output (MIMO) configuration information, and the MIMO configuration information includes 2*2 MIMO and/or 4*2 MIMO and/or 4*4 MIMO. Each HS-DSCH transmission channel is an HS-DSCH transmission channel configured by the other network device; and the total number of serving or secondary serving HS-DSCH cells corresponding to the HS-DSCH physical layer category is the total number of HS-DSCH transmission channels supported by the UE, or the total number of HS-DSCH transmission channels that can be configured by the other network device.

In an implementation manner of the present invention, if the UE supports 4*4 MIMO, and the network device configures 4*4 MIMO on some or all of the HS-DSCH transmission channels, the second allocating module 23 is specifically configured to:

for each HS-DSCH transmission channel configured with 4*4 MIMO, allocate the soft memory buffer among the HARQ processes of the corresponding HS-DSCH transmission channel; or for an HS-DSCH transmission channel not configured with 4*4 MIMO, use an HARQ process memory value calculated based on an HS-DSCH channel configured with a 4*4 MIMO operation; or for an HS-DSCH transmission channel not configured with 4*4 MIMO, use half of an HARQ process memory value calculated based on an HS-DSCH channel configured with a 4*4 MIMO operation.

In an implementation manner of the present invention, if the UE supports 4*4 MIMO, and the network device configures 4*2 MIMO on some or all of the HS-DSCH transmission channels, the second allocating module 23 is specifically configured to:

for each HS-DSCH transmission channel configured with 4*2 MIMO, allocate half of the memory of the soft memory buffer among the hybrid automatic repeat request (HARQ) processes of the corresponding HS-DSCH transmission channel; or for each HS-DSCH transmission channel configured with 4*2 MIMO, according to a case in which 4*4 MIMO is configured, allocate the soft memory buffer among the HARQ processes of the corresponding HS-DSCH transmission channel; or for an HS-DSCH transmission channel not configured with 4*2 MIMO, use an HARQ process memory value calculated based on an HS-DSCH channel configured with a 4*2 MIMO operation.

In an implementation manner of the present invention, if the UE does not support 4*4 MIMO, and the network device configures 4*2 MIMO on some or all of the HS-DSCH transmission channels, the second allocating module 23 is specifically configured to: for each HS-DSCH transmission channel configured with 4*2 MIMO, allocate the soft memory buffer among the HARQ processes of the corresponding HS-DSCH transmission channel; or for an HS-DSCH transmission channel not configured with 4*2 MIMO, use an HARQ process memory value calculated based on an HS-DSCH transmission channel configured with a 4*2 MIMO operation.

In an implementation manner of the present invention, the network device further includes:

a sending module, configured to send the number of HARQ processes corresponding to each HS-DSCH transmission channel configured by the network device to the other network device, so that the other network device sends the number of HARQ processes corresponding to each HS-DSCH transmission channel to the UE.

It should be noted that the sending module may send the number of HARQ processes of only one HS-DSCH transmission channel to the other network device, the other network device may send the received number of HARQ processes of the HS-DSCH transmission channel to the UE, and the UE may calculate the numbers of HARQ processes of other HS-DSCH transmission channels according to the first network configuration.

It should be noted that the network device of this embodiment is the second network device in the embodiment shown in FIG. 2, for example, a base station Node B; and the other network device of this embodiment is the first network device in the embodiment shown in FIG. 2, for example, an RNC.

Because the number of the HARQ processes and the memory size of each process which are configured on the user equipment side are the same as those configured on the network side, the specific implementation process in which the network device in this embodiment allocates the soft memory buffer size of each HS-DSCH transmission channel among the HARQ processes which are of the corresponding HS-DSCH transmission channel and are configured by the network device is the same as the process in which the user equipment allocates the soft memory buffer size of each HS-DSCH transmission channel among the HARQ processes in the first network configuration of the corresponding HS-DSCH transmission channel. Therefore, for the specific allocation process of the second allocating module 23, reference may be made to the related content about the first allocating module 13 in the embodiment shown in FIG. 2, and details are not described herein again.

The network device of the embodiment of the present invention obtains the total number of soft channel bits for memory allocation according to an HS-DSCH physical layer category of a UE included in a second network configuration sent by another network device, and divides the total number of soft channel bits by the total number of serving or secondary serving HS-DSCH cells corresponding to the HS-DSCH physical layer category of the UE, to obtain a memory size of each HS-DSCH transmission channel; and allocates the memory size of each HS-DSCH transmission channel among HARQ processes which are of the corresponding HS-DSCH transmission channel and are configured by the network device. In this way, it can be ensured that when the number of transmission channels actually configured by the other network device is not equal to the number of transmission channels corresponding to the HS-DSCH physical layer category of the UE, the memory size of each transmission channel can be determined according to the number of transmission channels corresponding to the HS-DSCH physical layer category, rather than a soft channel memory size of each transmission channel is determined according to the number of transmission channels actually configured by the other network device. Therefore, it is ensured that the number of soft channel bits obtained by each HARQ process does not exceed a maximum memory threshold of the corresponding HARQ process, thereby reducing errors in HARQ process memory allocation, and guaranteeing data transmission quality.

Figure 5:
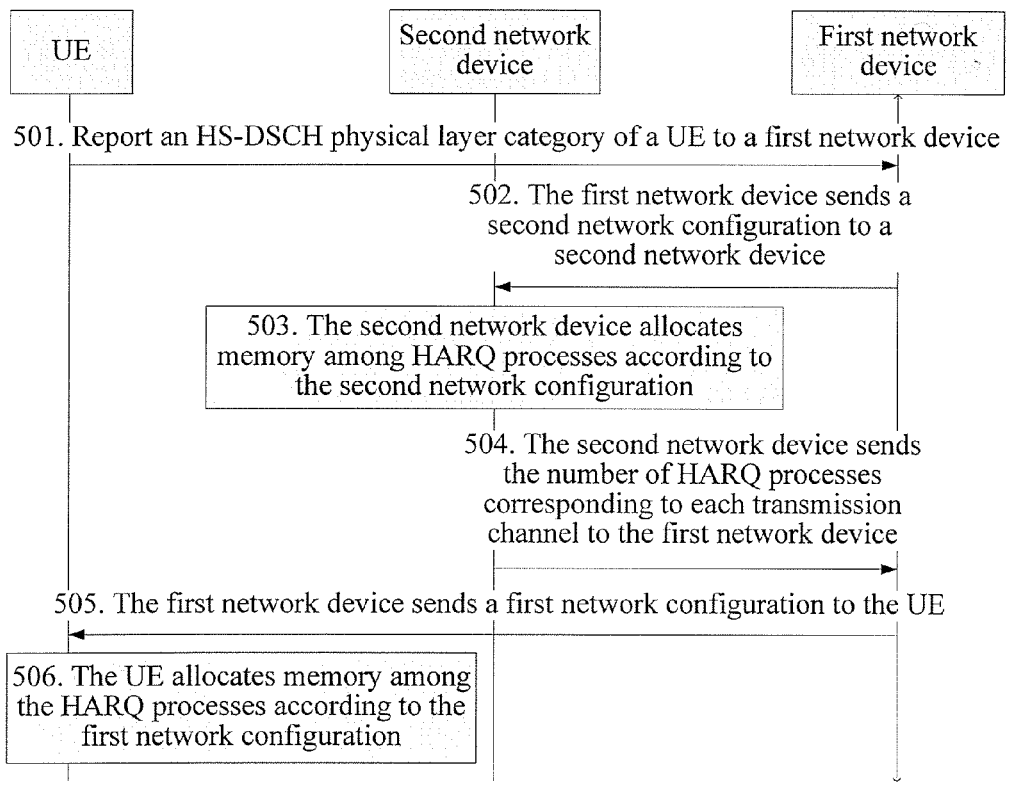
FIG. 5 is a signaling diagram of a memory allocation method according to another embodiment of the present invention.

FIG. 5 is a signaling diagram of a memory allocation method according to another embodiment of the present invention. The method specifically includes:

501: Report an HS-DSCH physical layer category of a UE to a first network device.

For example, the UE may carry the HS-DSCH physical layer category of the UE in a service request initiated to the first network device.

502: The first network device sends a second network configuration to a second network device.

For example, the second network configuration includes: the HS-DSCH physical layer category and/or at least one HS-DSCH transmission channel and/or multiple-input multiple-output (MIMO) configuration information of the UE, and the MIMO configuration information includes MIMO and/or 4*2 MIMO and/or 4*4 MIMO.

503: The second network device allocates memory among HARQ processes according to the second network configuration.

Specifically, the second network device uses the total number of soft channel bits corresponding to the HS-DSCH physical layer category of the UE as a total allocated memory size of a soft memory buffer, allocates the total allocated memory size of the soft memory buffer among the HS-DSCH transmission channels, and determines a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocates the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the second network device for the HS-DSCH transmission channel in the second network configuration according to the second network configuration.

504: The second network device sends the number of HARQ processes corresponding to each transmission channel to the first network device.

505: The first network device sends a first network configuration to the UE.

For example, the first network configuration includes at least one HS-DSCH transmission channel and the corresponding number of hybrid automatic repeat request (HARQ) processes and/or multiple-input multiple-output (MIMO) configuration information, and the MIMO configuration information includes MIMO and/or 4*2 MIMO and/or 4*4 MIMO.

It should be noted that, in order to ensure that the number of the HARQ processes and the memory size of each process which are configured on the user equipment side are the same as those configured on the network side, the number of HS-DSCH transmission channels included in the second network configuration is the same as the number of HS-DSCH transmission channels in the first network configuration sent by the first network device to the UE.

The first network configuration sent by the first network device to the UE carries the number of HARQ processes corresponding to each transmission channel sent by the second network device to the first network device.

506: The UE allocates memory among the HARQ processes according to the first network configuration.

The total number of soft channel bits corresponding to the determined HS-DSCH physical layer category is used as a total allocated memory size of a soft memory buffer. The total allocated memory size of the soft memory buffer is allocated among the HS-DSCH transmission channels, and a soft memory buffer size of each HS-DSCH transmission channel is determined, where the soft memory buffer size of each HS-DSCH transmission channel is the total allocated memory size of the soft memory buffer divided by the total number of serving or secondary serving HS-DSCH cells corresponding to the determined HS-DSCH physical layer category.

The soft memory buffer size of each HS-DSCH transmission channel is allocated among the HARQ processes in the first network configuration of the corresponding HS-DSCH transmission channel.

Another embodiment of the present invention further provides a user equipment, where the user equipment includes a first receiver, a first transmitter, and a first processor. When running, the first processor may execute the following steps:

determining a high speed downlink shared channel (HS-DSCH) physical layer category for memory allocation according to a first network configuration sent by a first network device, where the first network configuration includes at least one HS-DSCH transmission channel and the corresponding number of hybrid automatic repeat request (HARQ) processes;

using the total number of soft channel bits corresponding to the determined HS-DSCH physical layer category as a total allocated memory size of a soft memory buffer, allocating the total allocated memory size of the soft memory buffer among the HS-DSCH transmission channels, and determining a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocating the soft memory buffer size of each HS-DSCH transmission channel among the HARQ processes in the first network configuration of the corresponding HS-DSCH transmission channel.

The first network configuration further includes multiple-input multiple-output (MIMO) configuration information, and the MIMO configuration information includes 2*2 MIMO and/or 4*2 MIMO and/or 4*4 MIMO. Each HS-DSCH transmission channel is an HS-DSCH transmission channel of the first network configuration; and the total number of serving or secondary serving HS-DSCH cells corresponding to the determined HS-DSCH physical layer category is the total number of HS-DSCH transmission channels supported by the UE, or the total number of HS-DSCH transmission channels that can be configured by the first network device at most.

In a first possible implementation manner, if the UE configures 4*4 MIMO on some or all of the HS-DSCH transmission channels, the allocating the soft memory buffer size of each HS-DSCH transmission channel among the HARQ processes in the first network configuration of the corresponding HS-DSCH transmission channel specifically includes:

for each HS-DSCH transmission channel configured with 4*4 MIMO, allocating the soft memory buffer among the HARQ processes in the first network configuration; or for an HS-DSCH transmission channel not configured with 4*4 MIMO, using an HARQ process memory value calculated based on an HS-DSCH channel configured with a 4*4 MIMO operation; or for an HS-DSCH transmission channel not configured with 4*4 MIMO, using half of an HARQ process memory value calculated based on an HS-DSCH channel configured with a 4*4 MIMO operation.

In a second possible implementation manner, if the UE supports 4*4 MIMO, and the UE configures 4*2 MIMO on some or all of the HS-DSCH transmission channels, the allocating the soft memory buffer size of each HS-DSCH transmission channel among the hybrid automatic repeat request (HARQ) processes in the first network configuration of the corresponding HS-DSCH transmission channel specifically includes:

for each HS-DSCH transmission channel configured with 4*2 MIMO, allocating half of the memory of the soft memory buffer among the hybrid automatic repeat request (HARQ) processes in the first network configuration; or for each HS-DSCH transmission channel configured with 4*2 MIMO, according to a case in which 4*4 MIMO is configured, allocating the soft memory buffer among the configured hybrid automatic repeat request (HARQ) processes; or for an HS-DSCH transmission channel not configured with 4*2 MIMO, using an HARQ process memory value calculated based on an HS-DSCH channel configured with a 4*2 MIMO operation.

In a third possible implementation manner, if the UE does not support 4*4 MIMO, and the UE configures 4*2 MIMO on some or all of the HS-DSCH transmission channels, the allocating the soft memory buffer size of each HS-DSCH transmission channel among the hybrid automatic repeat request (HARQ) processes in the first network configuration of the corresponding HS-DSCH transmission channel specifically includes:

for each HS-DSCH transmission channel configured with 4*2 MIMO, allocating the soft memory buffer among the hybrid automatic repeat request (HARQ) processes in the first network configuration; or for an HS-DSCH transmission channel not configured with 4*2 MIMO, using an HARQ process memory value calculated based on an HS-DSCH channel configured with a 4*2 MIMO operation.

Another embodiment of the present invention further provides a network device, where the network device includes a second receiver, a second transmitter, and a second processor. When running, the second processor may execute the following steps:

receiving a second network configuration sent by another network device, where the second network configuration includes a high speed downlink shared channel (HS-DSCH) physical layer category and/or at least one HS-DSCH transmission channel of a user equipment (UE);

using the total number of soft channel bits corresponding to the HS-DSCH physical layer category of the UE as a total allocated memory size of a soft memory buffer, allocating the total allocated memory size of the soft memory buffer among the HS-DSCH transmission channels, and determining a soft memory buffer size of each HS-DSCH transmission channel, where the soft memory buffer size of each HS-DSCH transmission channel is the total allocated memory size of the soft memory buffer divided by the total number of serving or secondary serving HS-DSCH cells corresponding to the determined HS-DSCH physical layer category; and allocating the soft memory buffer size of each HS-DSCH transmission channel among hybrid automatic repeat request (HARQ) processes of the corresponding HS-DSCH transmission channel, where the hybrid automatic repeat request (HARQ) processes of the HS-DSCH transmission channel are HARQ processes configured by the network device for the HS-DSCH transmission channel in the second network configuration according to the second network configuration.

The second network configuration further includes multiple-input multiple-output (MIMO) configuration information, and the MIMO configuration information includes 2*2 MIMO and/or 4*2 MIMO and/or 4*4 MIMO. Each HS-DSCH transmission channel is an HS-DSCH transmission channel configured by the other network device; and the total number of serving or secondary serving HS-DSCH cells corresponding to the HS-DSCH physical layer category is the total number of HS-DSCH transmission channels supported by the UE, or the total number of HS-DSCH transmission channels that can be configured by the other network device at most.

In a first possible implementation manner, if the UE supports 4*4 MIMO, and the network device configures 4*4 MIMO on some or all of the HS-DSCH transmission channels, the allocating the soft memory buffer size of each HS-DSCH transmission channel among hybrid automatic repeat request (HARQ) processes of the corresponding HS-DSCH transmission channel specifically includes:

for each HS-DSCH transmission channel configured with 4*4 MIMO, allocating the soft memory buffer among the HARQ processes of the corresponding HS-DSCH transmission channel; or for an HS-DSCH transmission channel not configured with 4*4 MIMO, using an HARQ process memory value calculated based on an HS-DSCH channel configured with a 4*4 MIMO operation; or for an HS-DSCH transmission channel not configured with 4*4 MIMO, using half of an HARQ process memory value calculated based on an HS-DSCH channel configured with a 4*4 MIMO operation.

In a second possible implementation manner, if the UE supports 4*4 MIMO, and the network device configures 4*2 MIMO on some or all of the HS-DSCH transmission channels, the allocating the soft memory buffer size of each HS-DSCH transmission channel among the HARQ processes of the corresponding HS-DSCH transmission channel specifically includes:

for each HS-DSCH transmission channel configured with 4*2 MIMO, using half of the memory of the soft memory buffer among the hybrid automatic repeat request (HARQ) processes of the corresponding HS-DSCH transmission channel; or for each HS-DSCH transmission channel configured with 4*2 MIMO, according to a case in which 4*4 MIMO is configured, allocating the soft memory buffer among the HARQ processes of the corresponding HS-DSCH transmission channel; or for an HS-DSCH transmission channel not configured with 4*2 MIMO, using an HARQ process memory value calculated based on an HS-DSCH channel configured with a 4*2 MIMO operation.

In a third possible implementation manner, if the UE does not support 4*4 MIMO, and the network device configures 4*2 MIMO on some or all of the HS-DSCH transmission channels, the allocating the soft memory buffer size of each HS-DSCH transmission channel among hybrid automatic repeat request (HARQ) processes of the corresponding HS-DSCH transmission channel specifically includes:

for each HS-DSCH transmission channel configured with 4*2 MIMO, allocating the soft memory buffer among the hybrid automatic repeat request (HARQ) processes of the corresponding HS-DSCH transmission channel; or for an HS-DSCH transmission channel not configured with 4*2 MIMO, using an HARQ process memory value calculated based on an HS-DSCH transmission channel configured with a 4*2 MIMO operation.

Based on the first, the second, and the third possible implementation manners, in a fourth possible implementation manner, the second processor may send the number of HARQ processes corresponding to each HS-DSCH transmission channel configured by the network device to the other network device, so that the first network device carries the number of HARQ processes corresponding to each HS-DSCH transmission channel in the first network configuration, and sends the first network configuration to the UE. The first network device may send the number of HARQ processes of only one HS-DSCH transmission channel, and the UE may calculate the numbers of HARQ processes of other HS-DSCH transmission channels according to the first network configuration.

It can be clearly understood by persons skilled in the art that, for the purpose of convenient and brief description, for a detailed working process of the foregoing system, apparatus and unit, reference may be made to a corresponding process in the foregoing method embodiments, and the details are not described herein again.

In several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, various functional units in the embodiments of the present invention may be integrated into one processing unit, or each of the units may exist alone physically, or two or more units may also be integrated into one unit. The integrated units may be implemented in a form of hardware, or may also be implemented in a form of hardware and a software functional unit.

The integrated unit implemented in the form of a software functional unit may be stored in a computer readable access storage medium. The software function unit is stored in a storage medium and includes several instructions used to instruct a computer device (for example, a personal computer, a server, or a network device) to execute some steps of the methods according to the embodiments of the present invention. The storage medium includes any medium that can store program code, such as a USB flash disk, a removable hard disk, a read-only memory (Read-Only Memory, ROM for short), a random access memory (Random Access Memory, RAM for short), a magnetic disk or an optical disk.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that they may still make modifications to the technical solutions described in the embodiments, or equivalent replacements to part of technical features in the technical solutions; however, these modifications or replacements do not make the essence of corresponding technical solutions depart from scope of the technical solutions of the embodiments of the present invention.

What is claimed is:

1. A memory allocation method, comprising:
   determining, by a user equipment (UE), a high speed downlink shared channel (HS-DSCH) physical layer category for memory allocation according to a first network configuration sent by a first network device, wherein the first network configuration comprises at least one HS-DSCH transmission channel and the corresponding number of hybrid automatic repeat request (HARQ) processes;
   using the total number of soft channel bits corresponding to the determined HS-DSCH physical layer category as a total allocated memory size of a soft memory buffer, allocating the total allocated memory size of the soft memory buffer among the HS-DSCH transmission channels, and determining a soft memory buffer size of each HS-DSCH transmission channel, wherein the soft memory buffer size of each HS-DSCH transmission channel is obtained by dividing the total allocated memory size of the soft memory buffer divided by the total number of serving or secondary serving HS-DSCH cells corresponding to the determined HS-DSCH physical layer category, wherein the total number of serving or secondary serving HS-DSCH cells corresponding to the determined HS-DSCH physical layer category is the total number of HS-DSCH transmission channels supported by the UE, and the total number of serving or secondary serving HS-DSCH cells corresponding to the determined HS-DSCH physical layer category is not equal to the number of HS-DSCH transmission channels configured by the first network device for the UE; and
   allocating the soft memory buffer size of each HS-DSCH transmission channel among the HARQ processes in the first network configuration of the corresponding HS-DSCH transmission channel.

2. The method according to claim 1, wherein:
   each HS-DSCH transmission channel is configured by the first network device.

3. The method according to claim 1, wherein if the UE configures 4*4 MIMO on some or all of the HS-DSCH transmission channels, the method further comprises one of:
   for each HS-DSCH transmission channel configured with 4*4 MIMO, allocating the soft memory buffer among the HARQ processes in the first network configuration;
   for an HS-DSCH transmission channel not configured with 4*4 MIMO, using an HARQ process memory value calculated based on an HS-DSCH channel configured with a 4*4 MIMO operation; and
   for an HS-DSCH transmission channel not configured with 4*4 MIMO, using half of an HARQ process memory value calculated based on an HS-DSCH channel configured with a 4*4 MIMO operation.

4. The method according to claim 1, wherein if the UE supports 4*4 MIMO, and the UE configures 4*2 MIMO on some or all of the HS-DSCH transmission channels, the method further comprises one of:
   for each HS-DSCH transmission channel configured with 4*2 MIMO, allocating half of the memory of the soft memory buffer among the HARQ processes in the first network configuration;
   for each HS-DSCH transmission channel configured with 4*2 MIMO, according to a case in which 4*4 MIMO is configured, allocating the soft memory buffer among the configured HARQ processes; and
   for an HS-DSCH transmission channel not configured with 4*2 MIMO, using an HARQ process memory value calculated based on an HS-DSCH channel configured with a 4*2 MIMO operation.

5. The method according to claim 1, wherein if the UE does not support 4*4 MIMO, and the UE configures 4*2 MIMO on some or all of the HS-DSCH transmission channels, the method further comprises one of:
   for each HS-DSCH transmission channel configured with 4*2 MIMO, allocating the soft memory buffer among the HARQ processes in the first network configuration; and
   for an HS-DSCH transmission channel not configured with 4*2 MIMO, using an HARQ process memory value calculated based on an HS-DSCH channel configured with a 4*2 MIMO operation.

6. A user equipment (UE), comprising:
   a first processor, configured to:
     determine a high speed downlink shared channel (HS-DSCH) physical layer category for memory allocation according to a first network configuration sent by a first network device, wherein the first network configuration comprises at least one HS-DSCH transmission channel and the corresponding number of hybrid automatic repeat request (HARQ) processes; and
     use the total number of soft channel bits corresponding to the determined HS-DSCH physical layer category as a total allocated memory size of a soft memory buffer based on the HS-DSCH physical layer category, allocate the total allocated memory size of the soft memory buffer among the HS-DSCH transmission channels, and determine a soft memory buffer size of each HS-DSCH transmission channel, wherein the soft memory buffer size of each HS-DSCH transmission channel is obtained by dividing the total allocated memory size of the soft memory buffer by the total number of serving or secondary serving HS-DSCH cells corresponding to the determined HS-DSCH physical layer category, wherein the total number of serving or secondary serving HS-DSCH cells corresponding to the determined HS-DSCH physical layer category is the total number of HS-DSCH transmission channels supported by the UE, and the total number of serving or secondary serving HS-DSCH cells corresponding to the determined HS-DSCH physical layer category is not equal to the number of HS-DSCH transmission channels configured by the first network device for the UE; and
   a second processor, configured to allocate the soft memory buffer size of each HS-DSCH transmission channel among the HARQ processes in the first network configuration of the corresponding HS-DSCH transmission channel based on the soft memory buffer size of each HS-DSCH transmission channel.

7. The user equipment according to claim 6, wherein:
each HS-DSCH transmission channel is an HS-DSCH transmission channel configured by the first network device.

8. The user equipment according to claim 6, wherein if the UE supports 4*4 MIMO, and the UE configures 4*2 MIMO on some or all of the HS-DSCH transmission channels, the second processor is further configured to perform one of the following:
for each HS-DSCH transmission channel configured with 4*2 MIMO, allocate half of the memory of the soft memory buffer among the HARQ processes in the first network configuration;
for each HS-DSCH transmission channel configured with 4*2 MIMO, according to a case in which 4*4 MIMO is configured, allocate the soft memory buffer among the configured hybrid automatic repeat request (HARQ) processes; and
for an HS-DSCH transmission channel not configured with 4*2 MIMO, use an HARQ process memory value calculated based on an HS-DSCH channel configured with a 4*2 MIMO operation.

9. The user equipment according to claim 6, wherein if the UE does not support 4*4 MIMO, and the UE configures 4*2 MIMO on some or all of the HS-DSCH transmission channels, the second processor is further configured to perform one of the following:
for each HS-DSCH transmission channel configured with 4*2 MIMO, allocate the soft memory buffer among the HARQ processes in the first network configuration; and
for an HS-DSCH transmission channel not configured with 4*2 MIMO, use an HARQ process memory value calculated based on an HS-DSCH channel configured with a 4*2 MIMO operation.

10. A memory allocation method, comprising:
receiving, by a second network device, a second network configuration sent by a first network device, wherein the second network configuration comprises a high speed downlink shared channel (HS-DSCH) physical layer category and/or at least one HS-DSCH transmission channel of a user equipment (UE);
using the total number of soft channel bits corresponding to the HS-DSCH physical layer category of the UE as a total allocated memory size of a soft memory buffer, allocating the total allocated memory size of the soft memory buffer among the HS-DSCH transmission channels, and determining a soft memory buffer size of each HS-DSCH transmission channel, wherein the soft memory buffer size of each HS-DSCH transmission channel is obtained by dividing the total allocated memory size of the soft memory buffer by the total number of serving or secondary serving HS-DSCH cells corresponding to the determined HS-DSCH physical layer category, wherein the total number of serving or secondary serving HS-DSCH cells corresponding to the determined HS-DSCH physical layer category is the total number of HS-DSCH transmission channels supported by the UE, and the total number of serving or secondary serving HS-DSCH cells corresponding to the determined HS-DSCH physical layer category is not equal to the number of HS-DSCH transmission channels configured by the first network device for the UE; and
allocating the soft memory buffer size of each HS-DSCH transmission channel among hybrid automatic repeat request (HARQ) processes of the corresponding HS-DSCH transmission channel, wherein the HARQ processes of the HS-DSCH transmission channel are HARQ processes configured by the second network device for the HS-DSCH transmission channel in the second network configuration according to the second network configuration.

11. The method according to claim 10, wherein:
each HS-DSCH transmission channel is configured by the first network device.

12. The method according to claim 10, wherein if the UE supports 4*4 MIMO, and the second network device configures 4*4 MIMO on some or all of the HS-DSCH transmission channels, the method further comprises one of:
for each HS-DSCH transmission channel configured with 4*4 MIMO, allocating the soft memory buffer among the HARQ processes of the corresponding HS-DSCH transmission channel;
for an HS-DSCH transmission channel not configured with 4*4 MIMO, using an HARQ process memory value calculated based on an HS-DSCH channel configured with a 4*4 MIMO operation; and
for an HS-DSCH transmission channel not configured with 4*4 MIMO, using half of an HARQ process memory value calculated based on an HS-DSCH channel configured with a 4*4 MIMO operation.

13. The method according to claim 10, wherein if the UE supports 4*4 MIMO, and the second network device configures 4*2 MIMO on some or all of the HS-DSCH transmission channels, the method further comprises one of:
for each HS-DSCH transmission channel configured with 4*2 MIMO, allocating half of the memory of the soft memory buffer among the HARQ processes of the corresponding HS-DSCH transmission channel;
for each HS-DSCH transmission channel configured with 4*2 MIMO, according to a case in which 4*4 MIMO is configured, allocating the soft memory buffer among the HARQ processes of the corresponding HS-DSCH transmission channel; and
for an HS-DSCH transmission channel not configured with 4*2 MIMO, using an HARQ process memory value calculated based on an HS-DSCH channel configured with a 4*2 MIMO operation.

14. The method according to claim 10, wherein if the UE does not support 4*4 MIMO, and the second network device configures 4*2 MIMO on some or all of the HS-DSCH transmission channels, the method further comprises one of:
for each HS-DSCH transmission channel configured with 4*2 MIMO, allocating the soft memory buffer among the HARQ processes of the corresponding HS-DSCH transmission channel; and
for an HS-DSCH transmission channel not configured with 4*2 MIMO, using an HARQ process memory value calculated based on an HS-DSCH transmission channel configured with a 4*2 MIMO operation.

15. The method according to claim 10, further comprising:
sending, by the second network device, the number of HARQ processes corresponding to the HS-DSCH transmission channel to the first network device, so that the first network device carries the number of HARQ processes corresponding to the HS-DSCH transmission channel in the first network configuration and sends the first network configuration to the UE.

16. A network device, comprising:
a receiver, configured to receive a second network configuration sent by another network device, wherein the second network configuration comprises a high speed downlink shared channel (HS-DSCH) physical layer category and/or at least one HS-DSCH transmission channel of a user equipment (UE); and a processor, configured to:
  use the total number of soft channel bits corresponding to the HS-DSCH physical layer category of the UE as a total allocated memory size of a soft memory buffer according to the HS-DSCH physical layer category of the UE, allocate the total allocated memory size of the soft memory buffer among the HS-DSCH transmission channels, and determine a soft memory buffer size of each HS-DSCH transmission channel, wherein the soft memory buffer size of each HS-DSCH transmission channel is obtained by dividing the total allocated memory size of the soft memory buffer by the total number of serving or secondary serving HS-DSCH cells corresponding to the determined HS-DSCH physical layer category, wherein the total number of serving or secondary serving HS-DSCH cells corresponding to the determined HS-DSCH physical layer category is the total number of HS-DSCH transmission channels supported by the UE, and the total number of serving or secondary serving HS-DSCH cells corresponding to the determined HS-DSCH physical layer category is not equal to the number of HS-DSCH transmission channels configured by the first network device for the UE; and
  allocate the soft memory buffer size of each HS-DSCH transmission channel among hybrid automatic repeat request (HARQ) processes of the corresponding HS-DSCH transmission channel, wherein the HARQ processes of the HS-DSCH transmission channel are HARQ processes configured by the network device for the HS-DSCH transmission channel in the second network configuration according to the second network configuration.

17. The network device according to claim 16, wherein: each HS-DSCH transmission channel is configured by the other network device.

18. The network device according to claim 16, wherein if the UE supports 4*4 MIMO, and the network device configures 4*2 MIMO on some or all of the HS-DSCH transmission channels, the processor is further configured to perform one of the following:
  for each HS-DSCH transmission channel configured with 4*2 MIMO, allocate half of the memory of the soft memory buffer among the HARQ processes of the corresponding HS-DSCH transmission channel;
  for each HS-DSCH transmission channel configured with 4*2 MIMO, according to a case in which 4*4 MIMO is configured, allocate the soft memory buffer among the HARQ processes of the corresponding HS-DSCH transmission channel; and
  for an HS-DSCH transmission channel not configured with 4*2 MIMO, use an HARQ process memory value calculated based on an HS-DSCH channel configured with a 4*2 MIMO operation.

19. The network device according to claim 16, wherein if the UE does not support 4*4 MIMO, and the network device configures 4*2 MIMO on some or all of the HS-DSCH transmission channels, the processor is further configured to perform one of the following:
  for each HS-DSCH transmission channel configured with 4*2 MIMO, allocate the soft memory buffer among the HARQ processes of the corresponding HS-DSCH transmission channel; and
  for an HS-DSCH transmission channel not configured with 4*2 MIMO, use an HARQ process memory value calculated based on an HS-DSCH transmission channel configured with a 4*2 MIMO operation.

20. The network device according to claim 16, further comprising:
  a transmitter, configured to send the number of HARQ processes of the HS-DSCH transmission channel to the other network device, so that the other network device sends the number of HARQ processes corresponding to the HS-DSCH transmission channel to the UE.

* * * * *